(12) United States Patent
Khoshkava et al.

(10) Patent No.: US 10,551,964 B2
(45) Date of Patent: Feb. 4, 2020

(54) SYSTEMS AND METHODS FOR MANIPULATING A GRAPHICAL USER INTERFACE THROUGH GESTURES IN REAL SPACE AND PROVIDING ASSOCIATED HAPTIC EFFECTS

(71) Applicant: Immersion Corporation, San Jose, CA (US)

(72) Inventors: Vahid Khoshkava, Montreal (CA); Vincent Levesque, Montreal (CA); Juan Manuel Cruz-Hernandez, Montreal (CA); Mansoor Alghooneh, Montreal (CA); William Rihn, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 16/217,822

(22) Filed: Dec. 12, 2018

(65) Prior Publication Data
US 2019/0179477 A1      Jun. 13, 2019

Related U.S. Application Data

(63) Continuation of application No. 15/974,236, filed on May 8, 2018, now Pat. No. 10,185,441, which is a
(Continued)

(51) Int. Cl.
*G06F 3/041* (2006.01)
*G06F 3/01* (2006.01)
(Continued)

(52) U.S. Cl.
CPC ............ *G06F 3/0416* (2013.01); *G06F 1/163* (2013.01); *G06F 3/016* (2013.01); *G06F 3/017* (2013.01);
(Continued)

(58) Field of Classification Search
CPC ........ G06F 3/016; G06F 3/017; G06F 3/0416; G06F 2203/04101
See application file for complete search history.

(56) References Cited

U.S. PATENT DOCUMENTS 8,279,193 B1    10/2012  Birnbaum et al.
8,659,571 B2    2/2014  Birnbaum et al.
(Continued)

FOREIGN PATENT DOCUMENTS

CN      106896910 A     6/2017
EP      2 166 427 A1    3/2010
(Continued)

OTHER PUBLICATIONS

U.S. Appl. No. 14/577,461, filed Dec. 19, 2014 now U.S. Pat. No. 9,600,076 dated Mar. 21, 2017.
(Continued)

*Primary Examiner* — Laurence J Lee
(74) *Attorney, Agent, or Firm* — Kilpatrick Townsend & Stockton LLP

(57) ABSTRACT

One illustrative system of the present disclosure includes a sensor configured to detect a gesture that includes a movement through multiple positions in real space. The multiple positions can include a first position that is distant from a touch sensitive surface and a second position that is closer to the touch sensitive surface than the first position. The system also includes a processor in communication with the sensor. The processor can output a graphical user interface (GUI) that includes multiple available user interface levels. During the gesture, the processor can activate a sequence of user interface levels, where each user interface level in the sequence is selected from among the multiple available user interface levels and is activated at a respective position among the multiple positions in the gesture. The processor
(Continued)

can also cause a haptic output device to provide haptic feedback associated with each user interface level.

29 Claims, 7 Drawing Sheets

Related U.S. Application Data continuation of application No. 14/966,652, filed on Dec. 11, 2015, now Pat. No. 9,990,078.

(51) Int. Cl.
G06F 3/0484 (2013.01)
G06F 3/044 (2006.01)
G06F 1/16 (2006.01)

(52) U.S. Cl.
CPC ............ *G06F 3/044* (2013.01); *G06F 3/0484* (2013.01); *G06F 2203/04101* (2013.01)

(56) References Cited

U.S. PATENT DOCUMENTS

| | | | |
|---|---|---|---|
| 8,941,475 B2 | 1/2015 | Makinen et al. | |
| 9,201,585 B1* | 12/2015 | Karakotsios | G06F 3/0488 |
| 9,207,852 B1* | 12/2015 | Zhou | G06F 3/0488 |
| 9,448,713 B2 | 9/2016 | Cruz-Hernandez et al. | |
| 9,600,076 B2 | 3/2017 | Levesque et al. | |
| 9,658,693 B2 | 5/2017 | Levesque et al. | |
| 2009/0219255 A1* | 9/2009 | Woolley | G06F 3/0416 |
| | | | 345/173 |
| 2009/0289914 A1* | 11/2009 | Cho | G06F 3/044 |
| | | | 345/173 |
| 2009/0322498 A1 | 12/2009 | Yun et al. | |
| 2010/0107099 A1* | 4/2010 | Frazier | G06F 3/044 |
| | | | 715/765 |
| 2012/0062513 A1* | 3/2012 | Kang | G06F 3/044 |
| | | | 345/174 |
| 2012/0075348 A1* | 3/2012 | Kasahara | G06F 1/1626 |
| | | | 345/671 |
| 2012/0242793 A1* | 9/2012 | Im | G06F 3/011 |
| | | | 348/46 |
| 2013/0173658 A1 | 7/2013 | Adelman et al. | |
| 2014/0089849 A1* | 3/2014 | Choi | G06F 3/017 |
| | | | 715/810 |
| 2014/0168124 A1 | 6/2014 | Park et al. | |
| 2014/0340328 A1 | 11/2014 | Takakura et al. | |
| 2014/0362014 A1 | 12/2014 | Ullrich et al. | |
| 2014/0365927 A1* | 12/2014 | Sakai | G06F 3/0488 |
| | | | 715/764 |
| 2015/0175172 A1 | 6/2015 | Truong | |
| 2015/0185841 A1 | 7/2015 | Levesque et al. | |
| 2015/0268725 A1 | 9/2015 | Levesque et al. | |
| 2015/0355710 A1 | 12/2015 | Modarres et al. | |
| 2016/0147293 A1* | 5/2016 | Park | G06F 1/1656 |
| | | | 381/334 |
| 2016/0342208 A1 | 11/2016 | Levesque et al. | |
| 2017/0168630 A1 | 6/2017 | Khoshkava et al. | |

FOREIGN PATENT DOCUMENTS

| | | |
|---|---|---|
| EP | 3 179 340 A1 | 6/2017 |
| JP | 2017107567 A | 6/2017 |
| KR | 20170069936 A | 6/2017 |
| WO | 2008/042745 A2 | 4/2008 |

OTHER PUBLICATIONS

U.S. Appl. No. 14/577,565, filed Dec. 19, 2014 now U.S. Pat. No. 9,658,693 dated May 23, 2017.
U.S. Appl. No. 14/717,393, filed May 5, 2015 published US 2016-0342208 A1 on Nov. 24, 2016.
Arafsha et al., "Contactless haptic feedback: state of the art", 2015 IEEE International Symposium on Haptic, Audio and Visual Environments and Games (HAVE), IEEE, pp. 1-6, Oct. 11, 2015.
Carter et al., "UltraHaptics: Multi-Point Mid-Air Haptic Feedback for Touch Surfaces", In Proceedings of the 26th annual ACM symposium on User interface software and technology (UIST '13). ACM, New York, USA, Online Available at http://dx.doi.org/10.1145/2501988.2502018, Oct. 8-11, 2013, pp. 505-514.
Conn, A. et al., "Towards holonomic electro-elastomer actuators with six degrees of freedom", Smart Mater. Struct., vol. 21, No. 3, 2012.
EP 16203034.0, "Extended European Search Report", dated Feb. 22, 2017.
Hodgins, M. et al., "An electro-mechanically coupled model for the dynamic behavior of a dielectric electro-active polymer actuator", Smart Mater. Struct., vol. 23, No. 10, 2014.
Lee, J. et al., "A haptic touchscreen interface for mobile devices", ICMI '13 Proceedings of the 15th ACM on International conference on multimodal interaction, pp. 311-312, 2013.
Sodhi et al., "AIREAL: Interactive Tactile Experiences in Free Air", ACM Transactions on Graphics (TOG), vol. 32, Issue 4, Article No. 134, Jul. 22, 2013.
EP 16203034.0, "Office Action," dated Apr. 29, 2019, 6 pages.

\* cited by examiner

SYSTEMS AND METHODS FOR MANIPULATING A GRAPHICAL USER INTERFACE THROUGH GESTURES IN REAL SPACE AND PROVIDING ASSOCIATED HAPTIC EFFECTS

CROSS REFERENCE TO RELATED APPLICATIONS

This application is a continuation of and claims priority to U.S. patent application Ser. No. 15/974,236, filed May 8, 2018, and now U.S. Pat. No. 10,185,441, issued on Jan. 22, 2019, and entitled "Systems and Methods for Position-Based Haptic Effects," which is a continuation of U.S. patent application Ser. No. 14/966,652, filed on Dec. 11, 2015, and now U.S. Pat. No. 9,990,078, issued on Jun. 5, 2018, and entitled "Systems and Methods for Position-Based Haptic Effects," the entirety of each of which is hereby incorporated by reference herein.

FIELD OF THE INVENTION

The present invention relates to the field of user interface devices. More specifically, the present invention relates to position-based haptic effects.

BACKGROUND

The quality of the interfaces through which humans interact with computer-based systems is becoming increasingly important. To create more intuitive and enhanced user experiences, such systems may use visual, audio, and/or haptic feedback to reproduce aspects of interactions in the physical world. Such feedback is often generated upon a user contacting a touchscreen display or another user interface control. For example, a computer-based system may generate haptic feedback upon a user contacting a virtual button on a touchscreen display. Contact-based haptic feedback, however, may not accurately simulate an interaction with a real-world object. Thus, there is a need for additional systems and methods for providing haptic feedback.

SUMMARY

Embodiments of the present disclosure comprise computing devices configured to generate position-based haptic effects. In one embodiment, a system of the present disclosure may comprise a sensor configured to detect a gesture and transmit a sensor signal associated with the gesture. The gesture may comprise at least two positions, a first position of the at least two positions comprising a distance from a surface and a second position of the at least two positions comprising a contact with the surface. The system may also comprise a processor in communication with the sensor. The processor may be configured to receive the sensor signal from the sensor. The processor may also be configured to determine one or more haptic effects based at least in part on the sensor signal. The one or more haptic effects may be configured to provide substantially continuous haptic feedback throughout the gesture. The processor may further be configured to generate one or more haptic signals based at least in part on the one or more haptic effects, and transmit the one or more haptic signals. The system may further comprise a haptic output device in communication with the processor. The haptic output device may be configured to receive the one or more haptic signals and output the one or more haptic effects.

In another embodiment, a method of the present disclosure may comprise: receiving a sensor signal associated with a gesture from a sensor, wherein the gesture comprises at least two positions, a first position of the at least two positions comprising a distance from a surface and a second position of the at least two positions comprising a contact with the surface. The method may also comprise determining one or more haptic effects based at least in part on the sensor signal. The one or more haptic effects configured to provide substantially continuous haptic feedback throughout the gesture. The method may still further comprise generating one or more haptic signals based at least in part on the one or more haptic effects, and transmitting the one or more haptic signals to a haptic output device. The haptic output device may be configured to receive the one or more haptic signals and output the one or more haptic effects. Yet another embodiment comprises a computer-readable medium for implementing such a method.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1A:
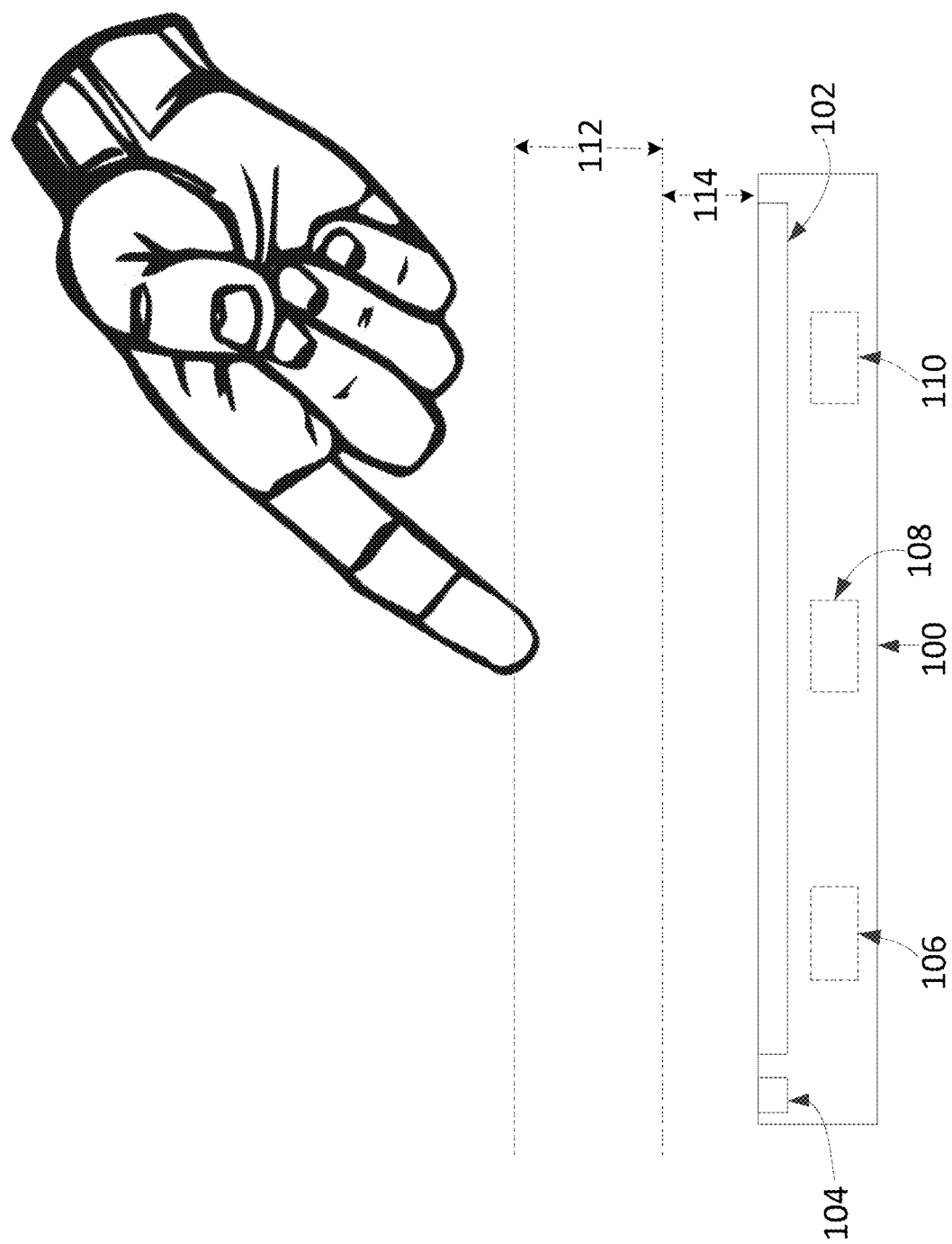
FIG. 1A shows an embodiment of a system for providing position-based haptic effects.

Reference will now be made in detail to various and alternative illustrative embodiments and to the accompanying drawings. Each example is provided by way of explanation and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Examples of Position-Based Haptic Effects

One illustrative embodiment of the present disclosure comprises a mobile device (e.g., a smart phone, tablet, e-reader, etc.). The mobile device comprises a touch-screen display configured to output a graphical user interface (GUI) with one or more virtual buttons. The GUI may comprise, for example, a home screen that includes multiple icons associated with programs stored on the mobile device. A user may interact with a virtual button, e.g., to execute a program or otherwise provide input to the mobile device.

In the illustrative embodiment, the mobile device is configured to provide substantially continuous haptic feedback to a user as the user approaches and ultimately contacts the touch-screen display, e.g., to interact with a virtual button. For example, in the illustrative embodiment, the mobile device is configured to detect the distance between the user's finger and the touch-screen display. The mobile device is configured to substantially continuously output remote haptic effects (e.g., puffs of air, an ultrasonic pressure wave, and/or laser beam stimulation) to the user's finger as the user's finger moves closer and closer to the virtual button output on the touch-screen display. In some embodiments, the mobile device outputs remote haptic effects that progressively increase in strength as the user approaches the touch-screen display. This may simulate a spring force, or another form of resistance, typically associated with a real, physical button. Further, in the illustrative embodiment, the mobile device is configured to output a local haptic effect (e.g., a click sensation) in response to the user contacting the virtual button via the touch-screen display. The local haptic effect may simulate the actuation of a physical button. In such an embodiment, providing continuous haptic feedback as the user approaches and ultimately contacts the virtual button output on the touch-screen display may more accurately simulate a real interaction with a physical button, and/or provide a three-dimensional feel to an otherwise two-dimensional user interface.

In another illustrative embodiment, the mobile device comprises a GUI that includes multiple user interface levels with which the user can interact. The mobile device is configured to activate different user interface levels as the user approaches and ultimately contacts the touch-screen display. The user can interact with a particular user interface level by performing a gesture at a distance (from the mobile device) associated with the user interface level.

For example, in some embodiments, the mobile device may execute a medical simulation comprising a GUI with multiple user interface levels. Each user interface level may be configured to output an image of, and/or provide information associated with, different facets of a body part (e.g., a human arm). For example, the mobile device may activate a first user interface level in response to detecting the user's finger is at a far distance from the mobile device. The first user interface level may output an image of an exterior of the body part (e.g., skin, hair, etc.). The mobile device may activate a second user interface level in response to detecting the user's finger is at a medium distance from the mobile device. The second user interface level may output an image of tissue and/or ligaments associated with the body part with key features labeled. The mobile device may activate a third user interface level in response to the user contacting the mobile device. The third user interface level may output an image of bones associated with the body part. Thus, as the user approaches and/or contacts the mobile device, the mobile device can activate "deeper" user interface levels, through which the user can access progressively more and/or different information. This may additionally or alternatively provide a three-dimensional feel to an otherwise two-dimensional interface.

In some embodiments, the mobile device is configured to provide substantially continuous haptic feedback associated with the user interface levels as the user approaches and contacts the touch-screen display. For instance, in the above medical simulation example, as the user approaches and contacts the touch-screen display, the mobile device may output substantially continuous haptic feedback configured to simulate pushing a finger deeper through the different layers of a real body part. In such an embodiment, the mobile device may output a haptic effect configured to simulate skin and/or hair in response to detecting the user's finger is at a distance associated with the first user interface level. The mobile device may output a haptic effect configured to simulate tissue and/or ligaments in response to detecting the user's finger is at a distance associated with the second user interface level. The mobile device may output a haptic effect configured to simulate bone in response to detecting that the user's finger contacted the mobile device. The combination of the haptic effects, e.g., as provided in a substantially continuous manner, may more realistically simulate a real-world interaction with the body part.

The description of the illustrative embodiment above is provided merely as an example. Various other embodiments of the present invention are described herein and variations of such embodiments would be understood by one of skill in the art. Advantages offered by various embodiments may be further understood by examining this specification and/or by practicing one or more embodiments of the claimed subject matter.

Illustrative Systems for Position-Based Haptic Effects

FIG. 1A shows an embodiment of a system for providing position-based haptic effects. In the embodiment, the system comprises a computing device 100 configured to provide substantially continuous haptic feedback as a user approaches and ultimately contacts the computing device 100. Additionally or alternatively, the computing device 100 may be configured to provide substantially continuous haptic feedback as computing device 100 approaches and ultimately contacts the user. As used herein, substantially continuous haptic feedback comprises one or more haptic effects provided substantially throughout the duration of a gesture performed by a user.

A gesture is any movement and/or positioning of the body and/or a physical object that conveys meaning or user intent. It will be recognized that simple gestures may be combined to form more complex gestures. For example, bringing a finger into contact with a surface may be referred to as a "finger on" gesture, while removing a finger from the surface may be referred to as a separate "finger off" gesture. If the time between the "finger on" and "finger off" gestures is relatively short, the combined gesture may be referred to as "tapping"; if the time between the "finger on" and "finger off" gestures is relatively long, the combined gesture may be referred to as "long tapping"; if the distance between the two dimensional (x, y) positions of the "finger on" and "finger off" gestures is relatively large, the combined gesture may be referred to as "swiping"; if the distance between the two dimensional (x, y) positions of the "finger on" and "finger off" gestures is relatively small, the combined gesture may be referred to as "smearing", "smudging", or "flicking" Gestures can additionally or alternatively be three dimensional. For example, a gesture may comprise positioning a body part and/or a physical object in a particular location in real space. In some embodiments, if the distance between three dimensional (x, y, z) positions during a finger movement (e.g., in real space) is relatively large, the combined gesture may be referred to as "swiping." If the distance between three dimensional (x, y, z) positions during a finger movement is relatively small, the combined gesture may be referred to as "smearing", "smudging", or "flicking." Any number of two dimensional or three dimensional simple or complex gestures may be combined in any manner to form any number of other gestures. A gesture can also be any form movement or positioning (e.g., of a body part or physical object) recognized by the computing device 100 and converted to electronic signals. Such electronic signals can activate a haptic effect, such as substantially continuous haptic feedback, where a position sensor 104 captures the user intent that generates a haptic effect.

In some embodiments, the computing device 100 is configured to provide substantially continuous haptic feedback to guide the user to a location of a particular virtual object (e.g., an enabled virtual button) output on the touch-screen display 102. For example, in such embodiment, the computing device 100 is configured to output a remote haptic effect (e.g., via haptic output device 106) in response to detecting the user positioned above the particular virtual object. The remote haptic effect may be perceptible by the user when the user is not contacting the computing device 100. The remote haptic effect may help the user initially locate the virtual object. In such an embodiment, the computing device 100 is further configured to continuously output remote haptic effects to the user as the user gestures toward the touch-screen display 102 while remaining positioned overtop of the virtual object. This may notify the user that the user is approaching the virtual object. In such an embodiment, the computing device 100 is also configured to output a local haptic effect in response to detecting the user contacting the virtual button via the touch-screen display 102. A local haptic effect may be perceptible by the user when the user is contacting the computing device 100. The local haptic effect may notify the user that the user interacted with the virtual object. The continuous haptic feedback as the user hovers over, approaches, and ultimately contacts the virtual object may guide the user to the virtual object, e.g., without the user having to look at the touch-screen display 102.

As a more specific example, in some embodiments, the computing device 100 is configured to output a first haptic effect (e.g., via haptic output device 106) in response to detecting a gesture over the virtual object at a first distance from the computing device 100 (e.g., within distance range 112 from the computing device 100). In such an embodiment, the computing device 100 is configured to output a second haptic effect (e.g., via haptic output device 108) in response to detecting a gesture over the virtual object at a second distance from the computing device 100 (e.g., within distance range 114, but not contacting computing device 100). Further still, in such an embodiment, the computing device 100 is configured to output a third haptic effect (e.g., via haptic output device 110) in response to detecting a gesture over the virtual object at a third distance from the computing device 100 (e.g., contacting the computing device 100 and/or touch-screen display 102). The first haptic effect, second haptic effect, and/or third haptic effect may be the same as or different from one another. For example, the first haptic effect may comprise an air puff, the second haptic effect may comprise a static ESF effect (e.g., as described in greater detail with respect to FIG. 2), and the third haptic effect may comprise a vibration.

In some embodiments, the computing device 100 configures the characteristics of (e.g., the waveform, type, amplitude, duration, frequency, and/or time of output) at least two haptic effects such that the transition between the at least two haptic effects is perceptibly seamless to the user. For example, the computing device 100 may configure the characteristics of the first haptic effect, second haptic effect, and third haptic effect such that transitions between the haptic effects are perceptibly seamless to the user. This may provide the user with a substantially consistent haptic experience, e.g., throughout a gesture. For example, this may provide the user with a substantially consistent haptic experience as the user approaches, contacts, and/or moves away from the computing device 100. In some embodiments, the computing device 100 configures the characteristics of at least two haptic effects such that the at least two haptic effects are clearly distinguishable to the user. For example, the computing device 100 may configure the characteristics of the first haptic effect, second haptic effect, and third haptic effect such that at least one transition between the haptic effects is distinctly perceptible to the user. This may provide the user with information, such as a distance between the user's body part and the computing device 100.

Embodiments may output any number and configuration of haptic effects to provide substantially continuous haptic feedback throughout a gesture. For example, in some embodiments, the computing device 100 outputs a fourth haptic effect in response to detecting another gesture within another distance range of the computing device 100, a fifth haptic effect and a sixth haptic effect in response to detecting still another gesture within still another distance range of the computing device 100, and so on.

Although the embodiments discussed above are with respect to a user approaching and ultimately contacting the computing device 100, some embodiments may provide substantially continuous haptic feedback throughout any gesture that includes at least one position in which the user is not contacting a surface (e.g., of the computing device 100) and one position in which the user is contacting the surface. For example, some embodiments may provide substantially continuous haptic feedback throughout a gesture in which the user approaches the computing device 100 with a finger, contacts the computing device 100 with the finger, and then lifts the finger away from the computing device 100. Thus, the substantially continuous haptic feedback can start and end with the user not contacting the computing device 100.

As another example, some embodiments provide substantially continuous haptic feedback throughout a gesture that begins after the user contacts the computing device 100 and ends after the user lifts the finger off of the computing device 100. For instance, the user may interact with a surface (e.g., a touch-screen display 102) of the computing device 100 with a body part. The computing device 100 may detect the user interaction and output a local haptic effect. The user may then lift the body part off of the computing device 100 (e.g., when the user is done interacting with the computing device 100). In some embodiments, the computing device 100 may continue to output haptic feedback to the user (e.g., in the form of remote haptic effects), e.g., while the user's body part is within the distance range 114 and/or distance range 112 from the computing device 100. The computing device 100 may output such haptic feedback until, e.g., a distance between the user's body part and the computing device 100 exceeds a threshold. Thus, the substantially continuous haptic feedback can start while the user is contacting the computing device 100 and end while the user is not contacting the computing device 100.

In some embodiments, the computing device 100 may use the same class of haptic effects (e.g., static ESF haptic effects) to output different sensations to a user at different positions, e.g., throughout a gesture. For example, the computing device 100 may be configured to output a first static ESF effect (e.g., configured to simulate a low-magnitude vibration) in response to detecting a gesture within distance range 112 from the computing device 100, a second static ESF effect (e.g., configured to simulate a medium-magnitude vibration) in response to detecting a gesture within distance range 114 from the computing device 100, and/or a third static ESF effect (e.g., a high-magnitude vibration) in response to detecting a gesture including contacting the computing device 100.

Figure 1B:
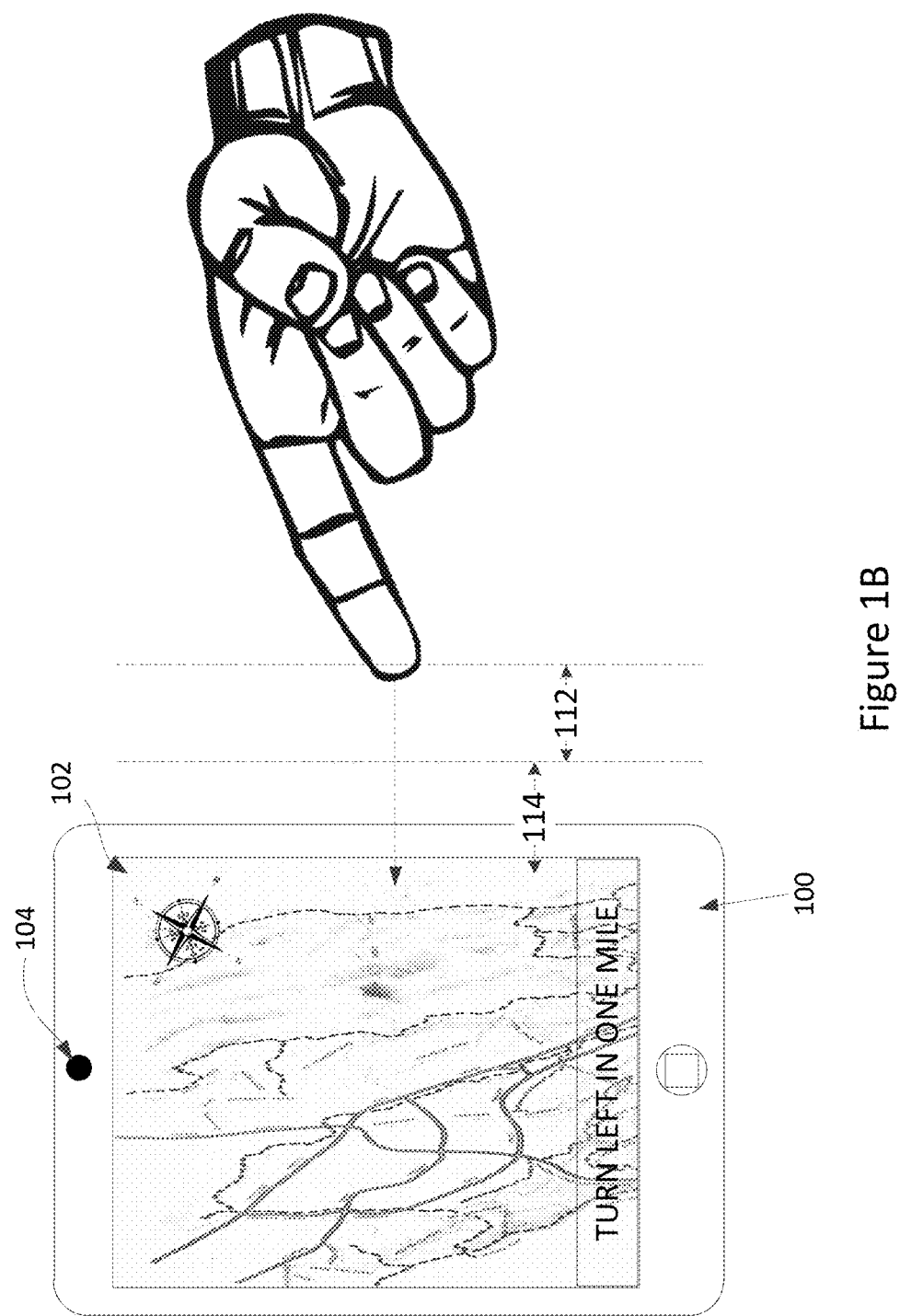
FIG. 1B shows another embodiment of a system for providing position-based haptic effects.

FIG. 1B shows another embodiment of a system for providing position-based haptic effects. In the embodiment, the system comprises a computing device 100 configured to output a user interface (e.g., via touch-screen display 102) comprising multiple user interface levels with which a user can interact. A user interface may comprise any number of user interface levels. Further, the computing device 100 may associate any number and/or configuration of user positions throughout a gesture with any number and/or configuration of user interface levels. For example, in some embodiments, the mobile device may associate three different user positions throughout a gesture with the same user interface level. In some embodiments, the user interface levels can be simulated as overlaying one another, for example, to provide a simulated depth to the user interface. In some embodiments, the computing device 100 is configured to execute one or more functions associated with each user interface level.

In the embodiment shown in FIG. 1B, the computing device 100 is outputting a virtual map associated with a navigation application. As the user approaches and/or contacts the computing device 100 (e.g., as shown by a dashed line), the computing device 100 is configured to cycle through one or more user interface levels, e.g., configured to provide the user with different levels of detail associated with the virtual map. For example, in response to the user positioning a finger within distance range 112 of the computing device 100, the computing device 100 may activate a first user interface level configured to, e.g., output information associated with states or cities on the virtual map. As the user moves the finger to within the second distance range 114 of, but not contacting, the computing device 100, the computing device 100 may activate a second user interface level configured to, e.g., add detail to the virtual map, such as town or street names. In response to the user contacting the computing device 100, the computing device 100 may activate a third user interface level configured to, e.g., zoom in on a particular location on the virtual map. Thus, the computing device 100 may activate different user interface levels associated with the virtual map in response to detecting the user gesturing within different distance ranges of the computing device 100.

In some embodiments, the computing device 100 is configured to determine a haptic effect to output based at least in part on the user interface level and/or the gesture. Such haptic effects may be configured to, e.g., notify the user of the particular user interface level with which the user is interacting and/or that the user switched between user interface levels. For example, the computing device 100 may output a first haptic effect in response to activating the first user interface level that is clearly distinguishable from a second haptic effect associated with activating the second user interface level. The distinguishable haptic effects may notify the user that the user has switched between user interface levels.

In some embodiments, the computing device 100 is configured to output haptic effects configured to indicate a precision with which the computing device 100 detected a gesture. For example, the computing device 100 may detect a gesture (e.g., or a portion of a gesture, such as a particular position of the user) with less precision when the gesture is performed is at a larger distance from the computing device 100. For instance, when the gesture is performed at a distance of 1 meter from the computing device 100, the computing device 100 may detect a position associated with the gesture to within 1 centimeter of the actual position. When the gesture is at a distance of 1 centimeter from the computing device 100, the computing device 100 may detect a position associated with the gesture to within one millimeter of the actual position. In some embodiments, the computing device 100 outputs a haptic effect that the user perceives as fuzzy in response to detecting the gesture with lower precision. The computing device 100 may output a haptic effect that the user perceives as sharp in response to detecting the gesture with higher precision. In some embodiments, the computing device 100 outputs a haptic effect to a larger surface area of the user's body in response to detecting the gesture with lower precision. The computing device 100 can output a haptic effect to a smaller surface area of the user's body in response to detecting the gesture with higher precision.

Figure 2:
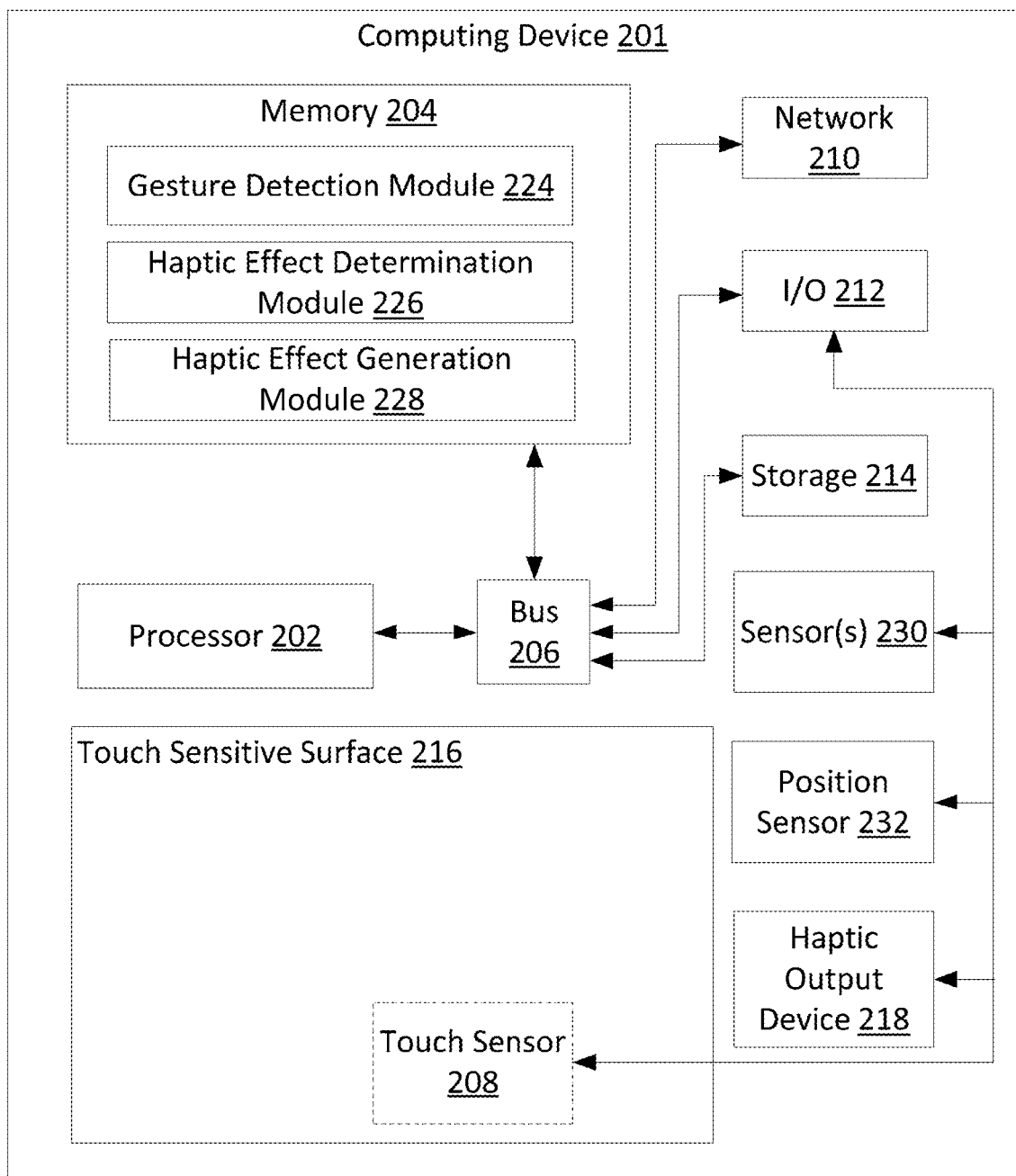
FIG. 2 is a block diagram showing a system for providing position-based haptic effects.

FIG. 2 is a block diagram showing a system for position-based haptic effects according to one embodiment. The computing device 201 may comprise a laptop computer, desktop computer, game controller, gamepad, remote control, medical device, car computing device (e.g., a computer for controlling one or more automobile systems or devices such as stereo, HVAC, lighting, navigation, or other vehicle functions), wand, stylus, pen, and/or a portable gaming device. In some embodiments, the computing device 201 is associated with a wearable device (e.g., a ring, a shoe, an armband, a sleeve, a jacket, glasses, a glove, a watch, a wristband, a bracelet, an article of clothing, a hat, a headband, and/or jewelry) and configured to be worn by a user and/or coupled to a user's body.

In some embodiments, the components (e.g., the processor 202, network interface device 210, haptic output device 218, sensors 230, position sensor 232, touch sensitive surface 216, etc.) of the computing device 201 may be integrated into a single housing. In other embodiments, the components may be distributed (e.g., among multiple housings or locations) and in electrical communication with one another. The computing device 201 may or may not comprise all of the components depicted in FIG. 2. For example, in some embodiments, the computing device 201 may not comprise the sensor 230.

The computing device 201 comprises a processor 202 interfaced with other hardware via bus 206. A memory 204, which can comprise any suitable tangible (and non-transitory) computer-readable medium such as RAM, ROM, EEPROM, or the like, may embody program components that configure operation of the computing device 201. In some embodiments, the computing device 201 may further comprise one or more network interface devices 210, input/output (I/O) interface components 212, and additional storage 214.

Network interface device 210 can represent one or more of any components that facilitate a network connection or otherwise facilitate communication between electronic devices. Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network).

I/O components 212 may be used to facilitate connection to devices such as one or more displays, touch sensitive surfaces 216, keyboards, mice, speakers, microphones, buttons, and/or other hardware used to input data or output data. Storage 214 represents nonvolatile storage such as read-only memory, flash memory, ferroelectric RAM (F-RAM), magnetic, optical, or other storage media included in the computing device 201 or coupled to processor 202.

The computing device 201 may comprise a touch sensitive surface 216. In some embodiments, the touch sensitive surface 216 is flexible or deformable. Touch sensitive surface 216 represents any surface that is configured to sense tactile input of a user. One or more touch sensors 208 are configured to detect a touch in a touch area (e.g., when an object, such as a user's finger or a stylus, contacts a touch sensitive surface 216) and transmit signals associated with the touch to processor 202. Any suitable number, type, or arrangement of touch sensors 208 can be used. For example, in some embodiments, resistive and/or capacitive sensors may be embedded in touch sensitive surface 216 and used to determine the location of a touch and other information, such as pressure, speed, and/or direction of the touch. In some embodiments, capacitive sensors may detect the proximity of a user's finger to the touch sensor 208 (e.g., embedded in the touch sensitive surface 216). For example, the touch sensor 208 may comprise a capacitive sensor configured to detect a change in capacitance as a user's finger approaches the touch sensor 208. The touch sensor 208 may determine whether the user's finger is within a particular distance of the touch sensor 208 based on the change in capacitance.

The touch sensor 208 can additionally or alternatively comprise other types of sensors. For example, optical sensors with a view of the touch sensitive surface 216 may be used to determine the touch position. As another example, the touch sensor 208 may comprise a LED (Light Emitting Diode) finger detector mounted on the side of a display. In some embodiments, touch sensor 208 may be configured to detect multiple aspects of the user interaction. For example, touch sensor 208 may detect the speed, pressure, and direction of a user interaction, and incorporate this information into the signal transmitted to the processor 202.

In some embodiments, the computing device 201 comprises a touch-enabled display that combines a touch sensitive surface 216 and a display of the device. The touch sensitive surface 216 may correspond to the display exterior or one or more layers of material above components of the display. In other embodiments, touch sensitive surface 216 may not comprise (or otherwise correspond to) a display, depending on the particular configuration of the computing device 201.

In some embodiments, the computing device 201 comprises one or more sensor(s) 230. The sensor(s) 230 are configured to transmit sensor signals to the processor 202. The sensor(s) 230 may comprise, for example, a range sensor, depth sensor, biosensor, camera, and/or temperature sensor. The computing device 201 may determine one or more haptic effects based at least in part on sensor signals from sensor 230. For example, in some embodiments, the computing device 201 may use data from sensor(s) 230 to determine one or more characteristics of a user's body part to which a haptic effect will be applied. The computing device 201 may determine one or more characteristics of the haptic effect based on the body part, e.g., to improve the quality of the perceived haptic effect and/or prevent injury to the user.

For example, in some embodiments, the computing device 201 executes a game, such as a war game. The computing device 201 may be configured to output a haptic effect (e.g., a remote haptic effect) in response to a game event, such as a virtual explosion. In some embodiments, the computing device 201 may receive one or more images from sensor 230 (e.g., a camera in view of the user's body). The computing device 201 may analyze the images and determine that a destination location on a user's body for a haptic effect comprises, e.g., hair. In some embodiments, a user may perceive a haptic effect on a body part comprising hair as weaker than on a body part without hair. In such an embodiment, the computing device 201 may determine and output a haptic effect based on the detected hair. For example, the computing device 201 may determine and output a haptic effect comprising an increased amplitude. This may improve the quality of the haptic effect perceived by the user.

As another example, in some embodiments, the computing device 201 may determine that a body part to which a haptic effect (e.g., a projected/remote haptic effect) is to be applied comprises, e.g., a particularly sensitive body part (e.g., an ear or eye). For example, the computing device 201 may analyze one or more images from sensor 230 and determine, based on the images, that the computing device 201 will output the haptic effect to a particular body part. The computing device 201 may determine, e.g., using a lookup table and/or algorithm, that the particular body part comprises a sensitive body part. For example, the computing device 201 may use a lookup table to map the particular body part to a corresponding sensitivity level. The computing device 201 may responsively determine a haptic effect with one or more characteristics (e.g., a type, amplitude, waveform, frequency, or other characteristic) configured to prevent and/or reduce the likelihood of injury to the body part.

For example, the computing device 201 may be executing a game simulating virtual bugs. In some embodiments, the computing device 201 may determine and output haptic effects configured to simulate bugs crawling on the user, such as on the user's ear. For example, the computing device may determine a remote haptic effect comprising a puff of air (or an ultrasonic wave) that is to be emitted toward the user's ear, e.g., to simulate a bug on the user's ear. In some embodiments, the computing device 201 may determine that the user's ear is a sensitive body part. The computing device 201 may responsively alter a characteristic of the haptic effect to decrease the likelihood of injuring the user. For example, the computing device 201 may decrease the amplitude or intensity of the puff of air (or the ultrasonic wave), e.g., to reduce the likelihood of injuring the user's hearing.

As another example, the computing device 201 may be executing a military game in which a user can control a virtual character. In response to the virtual character getting shot, the computing device 201 may be configured to output a haptic effect (e.g., a remote haptic effect) to a portion of the user's body associated with where the virtual character got shot. For example, the computing device 201 may be configured to project a hard material (e.g., a plastic pellet) toward the portion of the user's body associated with where the virtual character got shot. This may simulate the gun shot. In some embodiments, the computing device 201 may determine that the haptic effect is to be applied to, or projected toward, a sensitive portion of the user's body, such as the user's eye. In some embodiments, the computing device 201 may responsively change a haptic effect from one type (e.g., a remote haptic effect comprising an emission of a hard material, such as a plastic pellet) to another type (e.g., a remote haptic effect comprising an emission of a gas, such as a jet of air). This may reduce the likelihood of injury to the user's eye.

In some embodiments, the computing device 201 may determine that there is a risk that the haptic effect will be applied to, or projected toward, a sensitive body part. For example, in the above military game embodiment, the computing device 201 may determine a remote haptic effect configured to be projected toward the user's nose. For instance, the computing device 201 may determine that a plastic pellet is to be projected toward the user's nose in response to the user's virtual character getting shot in the nose. But the computing device 201 may also determine that the user is moving, increasing the likelihood that the projected material may contact a sensitive body part, such as the user's eye. The computing device 201 may responsively change the haptic effect from one type (e.g., a remote haptic effect comprising an emission of a hard material, such as a plastic pellet) to another type (e.g., a remote haptic effect comprising an emission of a soft material, such as foam). This may decrease the likelihood of injury to the sensitive body part.

In some embodiments, the sensor 230 (e.g., a temperature sensor) may be configured to detect a temperature of the user (e.g., a skin temperature of the user). In some embodiments, the computing device 201 may modify a characteristic of a haptic effect based on the temperature. For example, the computing device 201 may be configured to output a haptic effect comprising applying heat to at least a portion the user's body (e.g., the user's stomach) in response to, e.g., a game event, such as a virtual explosion. In such an embodiment, the computing device 201 may determine no haptic effect in response to a sensor signal from sensor 230 indicating, e.g., that the user's body temperature is above a threshold. For example, the computing device 201 may not output the haptic effect in response to determining that the user's body is too hot. This may prevent and/or reduce the likelihood of injury (e.g., heat stroke) to the user.

The computing device 201 is in communication with a position sensor 232. In some embodiments, the position sensor 232 comprises a camera, a 3D imaging system (e.g., the 3D imaging system commonly sold under the trademark Microsoft Kinect®), a depth sensor, an ultrasonic transducer, an accelerometer, a gyroscope, a radio frequency identification (RFID) tag or reader, an indoor proximity system, a NFC communication device, a global positioning system (GPS) device, a magnetometer, a wireless interface (e.g., an IEEE 802.11 or Bluetooth interface), an infrared sensor, a range sensor, and/or a LED-based tracking system. Position sensor 232 is configured to detect one or more positions of a user's body part and/or a physical object and transmit one or more associated sensor signals to the processor 202. The position can be a three-dimensional position in real space or a relative position with respect to the computing device 201. In some embodiments, the position sensor 232 is configured to detect a three-dimensional gesture in real space, e.g., based on a plurality of detected three-dimensional positions of a user's body part and/or a physical object.

In some embodiments, the processor 202 is configured to determine a gesture based on one or more sensor signals from the position sensor 232. For example, the user may make a gesture (e.g., a swiping gesture in real space). The computing device 201 may analyze a plurality of camera images associated with the gesture (e.g., taken by the position sensor 232) and determine one or more characteristics of the gesture (e.g., the type of gesture) based on the plurality of camera images. For example, the processor 202 may determine that the user made a particular type of gesture based on the camera images. As another example, in some embodiments, the position sensor 232 comprises a wireless interface that is configured to detect the strength of a wireless signal emitted by an electronic device worn by the user and/or coupled to the user's body (e.g., held by the user). The position sensor 232 may transmit a sensor signal associated with the wireless signal strength to the processor 202. Based on a plurality of different wireless signal strengths detected by the position sensor 232 over a period of time, the processor 202 may determine, for example, that the electronic device moved in a particular pattern associated with a particular gesture.

Figure 3:
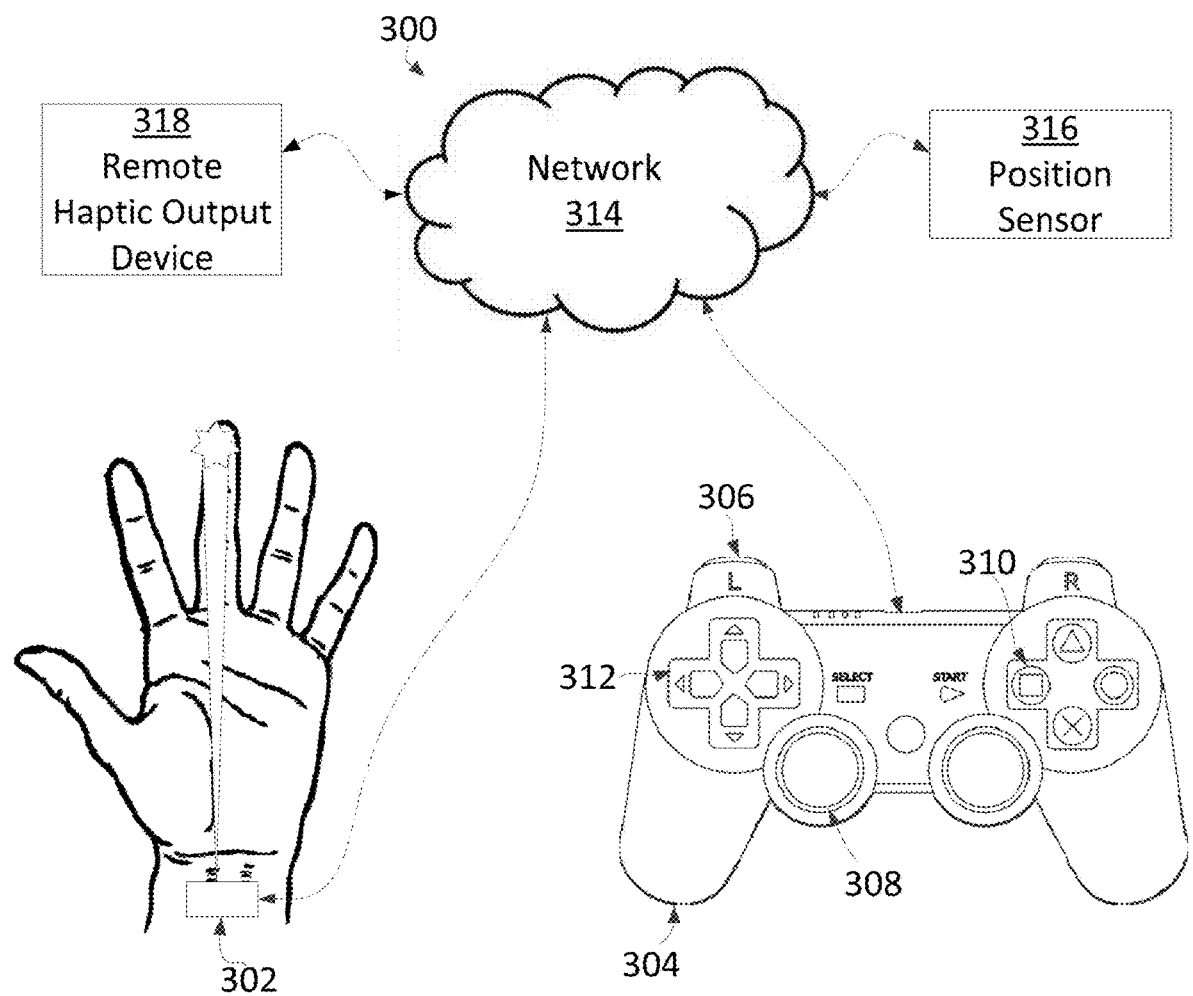
FIG. 3 shows an embodiment of a system for providing position-based haptic effects.

In some embodiments, the position sensor 232 is external to computing device 201 and in wired or wireless communication with the computing device 201 (e.g., as shown with respect to FIG. 3). For example, the position sensor 232 may comprise a camera associated with a wearable device (e.g., glasses or a tie) and in communication with the computing device 201. As another example, the position sensor 232 may comprise a 3D imaging system and/or a LED-based tracking system positioned external to the computing device 201 (e.g., on a shelf in a user's home) and in communication with the computing device 201.

In some embodiments, the computing device 201 comprises a haptic output device 218 in communication with processor 202. In some embodiments, a single haptic output device 218 is configured to output both local and remote haptic effects. The haptic output device 218 is configured to output a haptic effect (e.g., a remote haptic effect and/or a local haptic effect) in response to a haptic signal. A haptic effect may comprise, for example, a change in temperature, a stroking sensation, an electro-tactile effect, a change in temperature, and/or a surface deformation (e.g., a deformation of a surface associated with the computing device 201). Further, some haptic effects may use multiple haptic output devices 218 of the same or different types in sequence and/or in concert. Although a single haptic output device 218 is shown in FIG. 2, embodiments may use multiple haptic output devices 218 of the same or different type to produce haptic effects.

In some embodiments, the haptic output device 218 is external to computing device 201 and in communication with the computing device 201 (e.g., via wired interfaces such as Ethernet, USB, IEEE 1394, and/or wireless interfaces such as IEEE 802.11, Bluetooth, or radio interfaces). For example, the haptic output device 218 may be associated with (e.g., coupled to) a wearable device and configured to receive haptic signals from the processor 202.

In some embodiments, the haptic output device 218 is configured to output a haptic effect comprising a vibration. The haptic output device 218 may comprise, for example, one or more of a piezoelectric actuator, an electric motor, an electro-magnetic actuator, a voice coil, a shape memory alloy, an electro-active polymer, a solenoid, an eccentric rotating mass motor (ERM), a linear resonant actuator (LRA), and/or a plurality of conductive electrodes configured to vibrate due to electrostatic attraction and repulsion between the electrodes.

In some embodiments, the haptic output device 218 is configured to output a haptic effect modulating the perceived coefficient of friction of a surface associated with the haptic output device 218. In one embodiment, the haptic output device 218 comprises an ultrasonic actuator. An ultrasonic actuator may vibrate at an ultrasonic frequency, for example 20 kHz, increasing or reducing the perceived coefficient of an associated surface. In some embodiments, the ultrasonic actuator may comprise a piezo-electric material.

In some embodiments, the haptic output device 218 uses electrostatic attraction to output an electrostatic haptic effect. In some embodiments, the electrostatic haptic effect may comprise a simulated texture, a simulated vibration, a stroking sensation, and/or a perceived change in a coefficient of friction on a surface associated with computing device 201.

For example, in some embodiments, the haptic output device 218 may comprise a conducting layer and an insulating layer. In some embodiments, the conducting layer may comprise any semiconductor or other conductive material, such as copper, aluminum, gold, silver, graphene, carbon nanotubes, Indium tin oxide (ITO), platinum, poly (3,4-ethylenedioxythiophene) polystyrene sulfonate ("PEDOT:PSS), or any combination of these. In some embodiments, the insulating layer may comprise glass, plastic, polymer, silica, parylene, kapton tape, silicon dioxide ($SiO_2$), Aluminum Oxide ($Al_2O_3$), silicon nitride ($Si_3N_4$), or any combination of these. Furthermore, the processor 202 may operate the haptic output device 218 by applying an electric signal, for example an AC signal, to the conducting layer. In some embodiments, a high-voltage amplifier may generate the AC signal. The electric signal may generate a capacitive coupling between the conducting layer and an object (e.g., a user's finger, head, foot, arm, shoulder, leg, or other body part, or a stylus) near or touching the haptic output device 218. Varying the levels of attraction between the object and the conducting layer can vary the haptic effect perceived by a user.

In some embodiments, the conducting layer comprises a plurality of electrodes. The plurality of electrodes may be arranged in a particular pattern or configuration. For example, the plurality of electrodes may comprise a plurality of electrode strips. The electrode strips may be arranged in a diagonal pattern, a horizontal pattern, a vertical pattern, or another pattern across one or more surfaces of the computing device 201. As another example, one or more of the electrodes may comprise a circular, triangular, oval, square, rectangular, or other shape. For example, a perimeter or circumference of the electrodes may comprise a circular, triangular, oval, square, rectangular, or other shape. The plurality of electrodes may comprise any number of electrodes, arranged in any configuration, and including any number of shapes. In some embodiments, the processor 202 can actuate the haptic output device 218 by applying an electrical signal to all, or a subset of, the plurality of electrodes. The electric signal may generate a capacitive coupling between the electrodes and an object near or contacting the electrodes. A user may perceive the capacitive coupling as a haptic effect.

In some embodiments, the electrostatic haptic effect comprises a "dynamic ESF effect." A dynamic ESF effect may comprise an electrostatic haptic effect perceptible to a user upon a user's body part (e.g., a finger) moving relative to a surface associated with the haptic output device 218. For example, a dynamic ESF effect may be perceptible to the user upon the user sliding a finger along the surface of the insulator layer of the haptic output device 218. As another example, a dynamic ESF effect may be perceptible to the user upon the computing device 201 moving against the user's body (e.g., while the user remains still).

For example, the computing device 201 may output a graphical user interface (GUI) on a touch-screen display comprising one or more virtual user interface components (e.g., buttons, sliders, knobs, etc.). For instance, the GUI may comprise a virtual button. The user interface component may comprise a virtual texture, such as a plastic texture. In some embodiments, the computing device 201 may output a haptic effect in response to the user sliding a finger across a location on the touch-screen display associated with the user interface component. The haptic effect may comprise a dynamic ESF effect configured to, e.g., simulate the plastic texture.

In some embodiments, the electrostatic haptic effect comprises a static ESF effect. A static ESF effect may comprise an electrostatic haptic effect perceptible to a user without the user having to move a body part with respect to (e.g., across or perpendicular to) a surface associated with the haptic output device 218. For example, the user may be substantially stationary with the surface and still perceive the haptic effect. Further, the user may not need to contact the surface at all to perceive the static ESF effect. For example, in the above GUI embodiment, the computing device 201 may output a static ESF haptic effect in response to the user hovering a finger above the touch-screen display and over the user interface component. In some embodiments, the static ESF effect comprises repeatedly attracting and repelling the user's body part (e.g., finger) using electrostatic forces to, e.g., generate a vibration sensation. The haptic effect may, for example, notify to the user that the user is approaching and/or hovering over an enabled button or a disabled button.

In some embodiments, the haptic output device 218 comprises a deformation device configured to output a deformation haptic effect. The deformation haptic effect may comprise raising or lowering portions of a surface associated with the computing device 201. For example, the deformation haptic effect may comprise raising portions of a surface the computing device 201 to generate a bumpy texture. In some embodiments, the deformation haptic effect may comprise bending, folding, rolling, twisting, squeezing, flexing, changing the shape of, or otherwise deforming a surface associated with the computing device 201. For example, the deformation haptic effect may apply a force on the computing device 201 or a surface associated with the computing device 201, causing it to bend, fold, roll, twist, squeeze, flex, change shape, or otherwise deform. For example, in response to the user approaching the computing device 201, the computing device 201 may output a haptic effect configured to cause the computing device 201 to bend toward the user. This deformation haptic effect may be at least a part of substantially continuous haptic feedback provided to the user as the user approaches and ultimately contacts the computing device 201.

In some embodiments, the haptic output device 218 comprises fluid or other materials configured for outputting a deformation haptic effect (e.g., for bending or deforming the computing device 201 or a surface associated with the computing device 201). For example, the fluid may comprise a smart gel. A smart gel comprises a material with mechanical or structural properties that change in response to a stimulus or stimuli (e.g., an electric field, a magnetic field, temperature, ultraviolet light, shaking, or a pH variation). For instance, in response to a stimulus, a smart gel may change in stiffness, volume, transparency, and/or color. In some embodiments, stiffness may comprise the resistance of a surface associated with the computing device 201 against deformation. In some embodiments, one or more wires may be embedded in or coupled to the smart gel. As current runs through the wires, heat is emitted, causing the smart gel to expand or contract. This may cause the computing device 201 or a surface associated with the computing device 201 to deform.

As another example, the fluid may comprise a rheological (e.g., a magneto-rheological or electro-rheological) fluid. A rheological fluid comprises metal particles (e.g., iron particles) suspended in a fluid (e.g., oil or water). In response to an electric or magnetic field, the order of the molecules in the fluid may realign, changing the overall damping and/or viscosity of the fluid. This may cause the computing device 201 or a surface associated with the computing device 201 to deform.

In some embodiments, the haptic output device 218 comprises a mechanical deformation device. For example, in some embodiments, the haptic output device 218 may comprise an actuator coupled to an arm that rotates a deformation component. The deformation component may comprise, for example, an oval, starburst, or corrugated shape. The deformation component may be configured to move a surface associated with the computing device 201 at some rotation angles but not others. The actuator may comprise a piezo-electric actuator, rotating/linear actuator, solenoid, an electroactive polymer actuator, macro fiber composite (MFC) actuator, shape memory alloy (SMA) actuator, and/or other actuator. As the actuator rotates the deformation component, the deformation component may move the surface, causing it to deform. In such an embodiment, the deformation component may begin in a position in which the surface is flat. In response to receiving a signal from processor 202, the actuator may rotate the deformation component. Rotating the deformation component may cause one or more portions of the surface to raise or lower. The deformation component may, in some embodiments, remain in this rotated state until the processor 202 signals the actuator to rotate the deformation component back to its original position.

Further, other techniques or methods can be used to deform a surface associated with the computing device 201 and/or otherwise generate haptic effects. For example, the haptic output device 218 may comprise a flexible surface layer configured to deform its surface or vary its texture based upon contact from a surface reconfigurable haptic substrate (including, but not limited to, e.g., fibers and nanotubes). In some embodiments, the haptic output device 218 is deformed or otherwise generates haptic effects using e.g., a motor coupled to wires, air or pockets, resonant mechanical elements, micro-electromechanical systems ("MEMS") elements or pumps, thermal fluid pockets, variable porosity membranes, or laminar flow modulation.

In some embodiments, the haptic output device 218 is configured to remotely project haptic effects to a user (e.g., to generate remote haptic effects). For example, the haptic output device 218 may comprise one or more jets configured to emit materials (e.g., solids, liquids, gasses, or plasmas) toward the user (e.g., a body part of the user). In one such embodiment, the haptic output device 218 comprises a gas jet configured to emit puffs or streams of oxygen, nitrogen, or another gas with varying characteristics upon receipt of the haptic signal. As another example, the haptic output device 218 may comprise one or more ultrasonic transducers or speakers configured to project pressure waves in the direction of the user. In one such embodiment, the processor 202 may cause the haptic output device 218 to emit a concentrated pressure wave toward the user in response to the user gesturing in real space. The concentrated pressure wave may vibrate a portion of the user's body (e.g., the user's finger). The user may perceive the vibration as a haptic effect.

In some embodiments, the haptic output device 218 may be a portion of the housing of the computing device 201. In other embodiments, the haptic output device 218 may be housed inside a flexible housing overlaying a surface associated with the computing device 201 (e.g., the front or back of the computing device 201). In some embodiments, the haptic output device 218 may itself be flexible.

Turning to memory 204, modules 224, 226, and 228 are depicted to show how a device can be configured in some embodiments to provide position-based haptic effects. In some embodiments, the gesture detection module 224 comprises one or more algorithms or lookup tables useable by the processor 202 to determine, for example, a gesture by the user.

In some embodiments, the gesture detection module 224 comprises code for detecting a contact with the computing device 201. For example, in such an embodiment, the gesture detection module 224 may sample the touch sensor 208 to determine if the user has contacted the touch sensitive surface 216. In another such embodiment, the gesture detection module 224 may analyze a plurality of pictures from position sensor 232 and determine if pixels corresponding to a body part of the user overlay pixels associated with the computing device 201. If so, the gesture detection module 224 may determine, e.g., the user is contacting the computing device 201.

In some embodiments, the gesture detection module 224 comprises code for analyzing data received via the network interface device 210 to determine a position of the user with respect to the computing device 201. For example, in some embodiments, the user may be wearing a device, such as a smart ring or smart watch, comprising a GPS sensor. In such an embodiment, the device may be configured to transmit signals associated with the GPS position of the device (e.g., the GPS position of a body part of the user) to the computing device 201. In some embodiments, the gesture detection module 224 comprises code for receiving the GPS position from the device and comparing the GPS position to a GPS position of the computing device 201 (e.g., as detected by sensor 230). This may allow the computing device 201 to determine a position of the device (e.g., the user) with respect to the computing device 201. The gesture detection module 224 may comprise code for determining a gesture based on the position.

Haptic effect determination module 226 represents a program component that analyzes data to determine a haptic effect to generate. The haptic effect determination module 226 may comprise code that selects one or more haptic effects to output using one or more algorithms or lookup tables. In some embodiments, the haptic effect determination module 226 comprises code for determining one or more haptic effects to output based on a detected gesture. For example, the processor 202 may access a lookup table stored in haptic effect determination module 226 to map a specific gesture to a particular haptic effect, such as a puff of air or an electrostatic haptic effect.

In some embodiments, the haptic effect determination module 226 comprises code that determines a plurality of haptic effects to output using one or more haptic output devices 218, e.g., to provide substantially continuous haptic feedback throughout a gesture. For example, the haptic effect determination module 226 may comprise code for selecting two or more different haptic output devices from among a plurality of available haptic output devices to use in combination with one another to provide the substantially continuous haptic feedback as a user approaches and contacts computing device 201.

Haptic effect generation module 228 represents programming that causes processor 202 to generate and transmit haptic signals to the haptic output device 218 to generate a selected haptic effect. For example, the haptic effect generation module 228 may access stored waveforms or commands to send to the haptic output device 218 to create the desired haptic effect. In some embodiments, the haptic effect generation module 228 may comprise algorithms to determine the haptic signal. Further, in some embodiments, haptic effect generation module 228 may comprise algorithms to determine target coordinates for the haptic effect (e.g., coordinates for a location on a user's body to which to output a haptic effect).

Although the modules 224, 226, 228 are depicted in FIG. 2 as program components within the memory 204, in some embodiments, the modules 224, 226, 228 may comprise hardware. For example, modules 224, 226, 228 may comprise analog to digital converters, processors, microcontrollers, comparators, amplifiers, transistors, and other analog or digital circuitry.

FIG. 3 shows an embodiment of a system 300 for providing position-based haptic effects. The system 300 comprises a wearable computing device 302, a graspable computing device 304, a position sensor 316, and/or a remote haptic output device 318 connected to a network 314. The wearable computing device 302 and/or graspable computing device may be configured substantially the same as the computing device 201 of FIG. 2.

The computing devices 302, 304, position sensor 316, and/or remote haptic output device 318 may directly communicate with each other and/or may communicate with each other via the network 314. For example, the wearable computing device 302 may directly wirelessly communicate with the graspable computing device 304 (e.g., using Bluetooth).

The system 300 can use any number, combination, and/or configuration of wearable computing devices 302, graspable computing devices 304, position sensors 316, and/or remote haptic output devices 318 to provide substantially continuous haptic feedback throughout a gesture. For example, in some embodiments, the wearable computing device 302, graspable computing device 304, the position sensor 316, and the remote haptic output device 318 work together to provide substantially continuous haptic feedback to the user, e.g., as the user approaches, contacts, and/or lifts a finger off of a user interface component of the graspable computing device 304, such as a trigger 306, joystick 308, button 310, and/or directional pad 312.

As a particular example, in some embodiments, the user may be wearing a virtual reality headset to play a video game in which the user's vision is substantially blocked. In such an embodiment, the system 300 may be configured to output substantially continuous haptic feedback as the user approaches and ultimately picks up the graspable computing device 304, e.g., to guide the user to the graspable computing device 304, which the user may not otherwise be able to see. For example, the position sensor 316 may detect the user approaching the graspable computing device 304 and transmit associated sensor signals to the wearable computing device 302 and/or the remote haptic output device 318. The wearable computing device 302 and/or the remote haptic output device 318 may responsively output haptic effects, e.g., with decreasing magnitudes as the user gets closer to the graspable computing device 304. In response to the user finally contacting the graspable computing device 304, the graspable computing device 304 may to output a haptic effect, such as a vibration. In some embodiments, the combination of haptic effects from various components of the system 300 may provide substantially continuous haptic feedback to the user, e.g., to guide the user toward the graspable computing device 304.

In some embodiments, the system 300 is configured to output one or more haptic effects configured to provide information to the user. For example, the user may hold the graspable computing device 304, e.g., to play a video game. The system 300 may detect a user's body part hovering over, but not contacting, a particular user interface component of the graspable computing device 304 (e.g., trigger 306). In some embodiments, the system 300 may responsively output a haptic effect (e.g., a puff of air) toward the user (e.g., toward the back of the user's finger over the trigger 306). The haptic effect may be configured to notify the user of, for example, a characteristic of the user interface component. For instance, in such an embodiment, the haptic effect may notify the user of the type, location, functionality, and/or status of the user interface component, such as whether the user interface component is enabled. This may allow the user to determine, for example, whether a particular user interface is enabled without physically contacting the user interface component.

Further, in some embodiments, the system 300 is configured to provide continuous haptic feedback as the user hovers over, approaches, and ultimately contacts the user interface component. In some embodiments, the system 300 is configured to additionally or alternatively provide continuous haptic feedback as the user moves a finger away from the user interface component (e.g., after interacting with the user interface component). The haptic feedback output as the user moves away from the user interface component may be different from the haptic feedback output as the user approaches and/or contacts the user interface component. For example, system 300 may output haptic feedback as the user moves away from the user interface component that is configured to indicate to the user that the user interface component is no longer enabled.

In some embodiments, the system 300 additionally or alternatively outputs a user interface (e.g., via a display) with multiple user interface levels. For example, the system 300 may execute a video game (e.g., the graspable computing device 304 itself may execute the video game) comprising a user interface. The video game may comprise a virtual object, such as a virtual laser gun. In some embodiments, the system 300 may detect the user interacting with and/or activating a first user interface level of the user interface in response to a first gesture (e.g., the user positioning a body part and/or a physical object in a first position with respect to the graspable computing device 304). For example, the system 300 may detect the user interacting with and/or activating the first user interface level in response to the user hovering a finger over the trigger 306 of the graspable computing device 304. In some embodiments, the system 300 may perform a function (e.g., loading an ammunition magazine into the virtual laser gun) associated with the first user interface level. Additionally or alternatively, the system 300 may output a haptic effect associated with the first user interface level, such as a haptic effect configured to simulate loading an ammunition magazine into the virtual laser gun.

Further, in some embodiments, the system 300 may detect the user interacting with and/or activating a second user interface level in response to the user positioning the body part in a second position with respect to the graspable computing device 304. For example, system 300 may detect the user may interacting with and/or activating the second user interface level in response to the user hovering the finger over the trigger 306 more closely to the graspable computing device 304. In some embodiments, the system 300 may perform a function (e.g., charging up the virtual laser gun) associated with the second user interface level. The system 300 may additionally or alternatively output a haptic effect associated with the second user interface level, such as a haptic effect configured to simulate charging the virtual laser gun.

Further still, in some embodiments, the system 300 may detect the user interacting with and/or activating a third user interface level in response to the user positioning the body part in a third position with respect to the graspable computing device 304. For example, the system 300 may detect the user interacting with and/or activating the third user interface level in response to the user pressing the trigger 306 of the graspable computing device 304. In some embodiments, the system 300 may perform a function (e.g., firing the virtual laser gun) associated with the third user interface level. The system 300 may additionally or alternatively output a haptic effect associated with the third user interface level, such as a haptic effect configured to simulate firing the virtual laser gun. Thus, the user may be able to perform a plurality of functions by positioning a body part at different locations over a particular user interface component. This may provide a more intuitive and simplified experience for the user.

Figure 4:
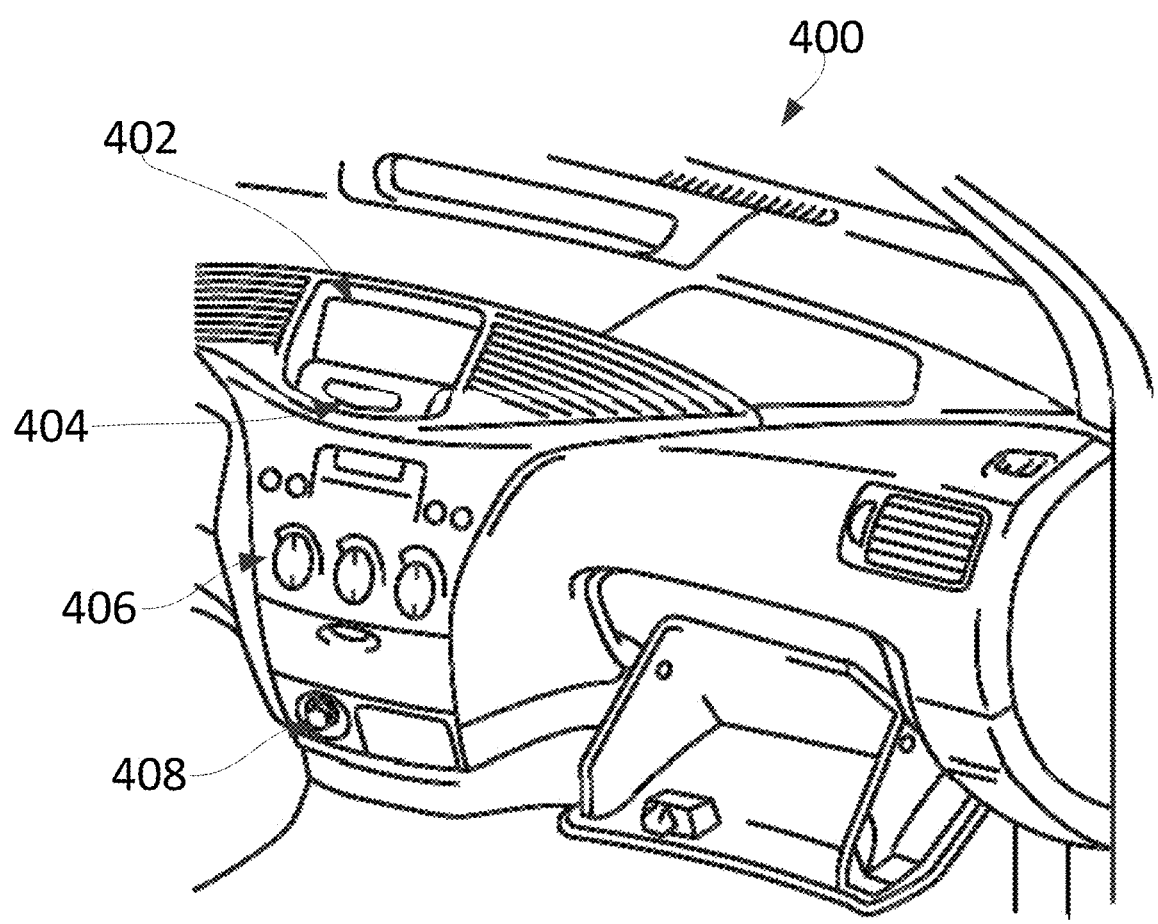
FIG. 4 shows another embodiment of a system for providing position-based haptic effects.

FIG. 4 shows another embodiment of a system 400 for providing position-based haptic effects. The system 400 comprises a vehicle. The vehicle comprises a computing device (e.g., internal to the vehicle). Although the vehicle in FIG. 4 comprises a car, in other embodiments, the vehicle may comprise a truck, boat, airplane, motorcycle, etc.

The computing device is in communication with one or more user interface components (e.g., joysticks, buttons, triggers, switches, knobs, touch sensitive surfaces, etc.). In the example shown in FIG. 4, the computing device is in communication with a touchscreen display 402 and multiple buttons 406. The system 400 also comprises a position sensor 404 and a haptic output device. The haptic output device is configured to provide a user with local and/or remote haptic effects.

In some embodiments, the computing device is configured to provide the user with haptic feedback (e.g., substantially continuous haptic feedback) in response to a gesture in real space. For example, the computing device may output a GUI via the touchscreen display 402 configured for, e.g., changing one or more vehicle settings, such as an audio volume, radio station, air conditioning or heat level, and/or GPS navigation setting. In some embodiments, the computing device is configured to provide the user with substantially continuous haptic feedback as the user approaches, contacts, and/or moves away from a particular virtual object of the GUI (e.g., a virtual button for adjusting an audio volume). In such an embodiment, the computing device may stop outputting the haptic feedback in response to detecting that the user is no longer gesturing over (e.g., hovering a finger over) the virtual object, and/or that a distance between the virtual object and the user exceeds a threshold (e.g., the user has moved far enough away from the virtual object). In some embodiments, such continuous haptic feedback may allow the user to locate a desired user interface component and/or safely interact with the computing device, e.g., without visually focusing on the touchscreen display, which may prevent an accident or injury.

As an example, in some embodiments, the computing device is configured to detect the user gesturing (e.g., with a finger) over a virtual button output on the GUI, e.g., for changing a radio station. The computing device is configured to responsively output a remote haptic effect (e.g., an ultrasonic pressure wave) configured to, e.g., notify the user that the user is gesturing over the particular virtual object. In some embodiments, the computing device is configured to continue outputting remote haptic effects in response to detecting the user approaching the virtual button. In such an embodiment, the computing device may modulate the strength of the remote haptic effects, e.g., such that the user perceives the remote haptic effects as having a substantially constant magnitude. Thus, the user may perceive the remote haptic effects as having a substantially constant magnitude, e.g., even though the user may be moving closer to the source of the remote haptic effects. In some embodiments, the computing device is configured to detect the user contacting the virtual object (e.g., via the touchscreen display 402 and/or position sensor 404). The computing device may responsively stop outputting the remote haptic effects and/or output a local haptic effect comprising, e.g., a pulsed vibration. This may confirm to the user that the computing device received the user input. In some embodiments, the computing device is configured to continuously output the local haptic effect, e.g., until the computing device detects the user moving the body part away from, and/or no longer contacting, the virtual object. The computing device may then output one or more remote haptic effects, e.g., until a distance between the user and the virtual object exceeds a threshold.

Although the above discussion is with reference to a virtual object (e.g., output on a touchscreen display 402), in some embodiments, the computing device may be configured to output haptic effects based on gestures performed with respect to one or more physical user interface components, such as buttons 406, triggers, switches, joysticks 408, knobs, etc.

In some embodiments, the computing device outputs a user interface comprising multiple user interface levels, e.g., via the touchscreen display 402. For example, in some embodiments, the computing device is configured to output a GUI associated with a radio in the car. In some embodiments, the user may interact with a first user interface level of the user interface by hovering a finger over a virtual button, such as a radio station scan button, output on the touchscreen display 402. In some embodiments, the computing device may perform a function associated with the first user interface level. For example, the computing device may output (e.g., via the touchscreen display 402) a description of a function associated with virtual button, such as "HOVER CLOSER TO SCAN, TAP TO TURN OFF." The computing device may output a haptic effect configured to simulate, e.g., the presence or actuation of a physical button. Further, in some embodiments, the user may interact with a second user interface level by gesturing closer to the virtual button. In some embodiments, the computing device is configured to responsively scan through a plurality of radio stations. Further still, in some embodiments, the user may interact with a third user interface level by contacting the touchscreen display 402 (e.g., and/or the virtual button output thereon). In some embodiments, the computing device is configured to responsively turn off the radio. Thus, in some embodiments, computing device is configured to perform a number of functions in response to the user interacting with various user interface levels.

Figure 5:
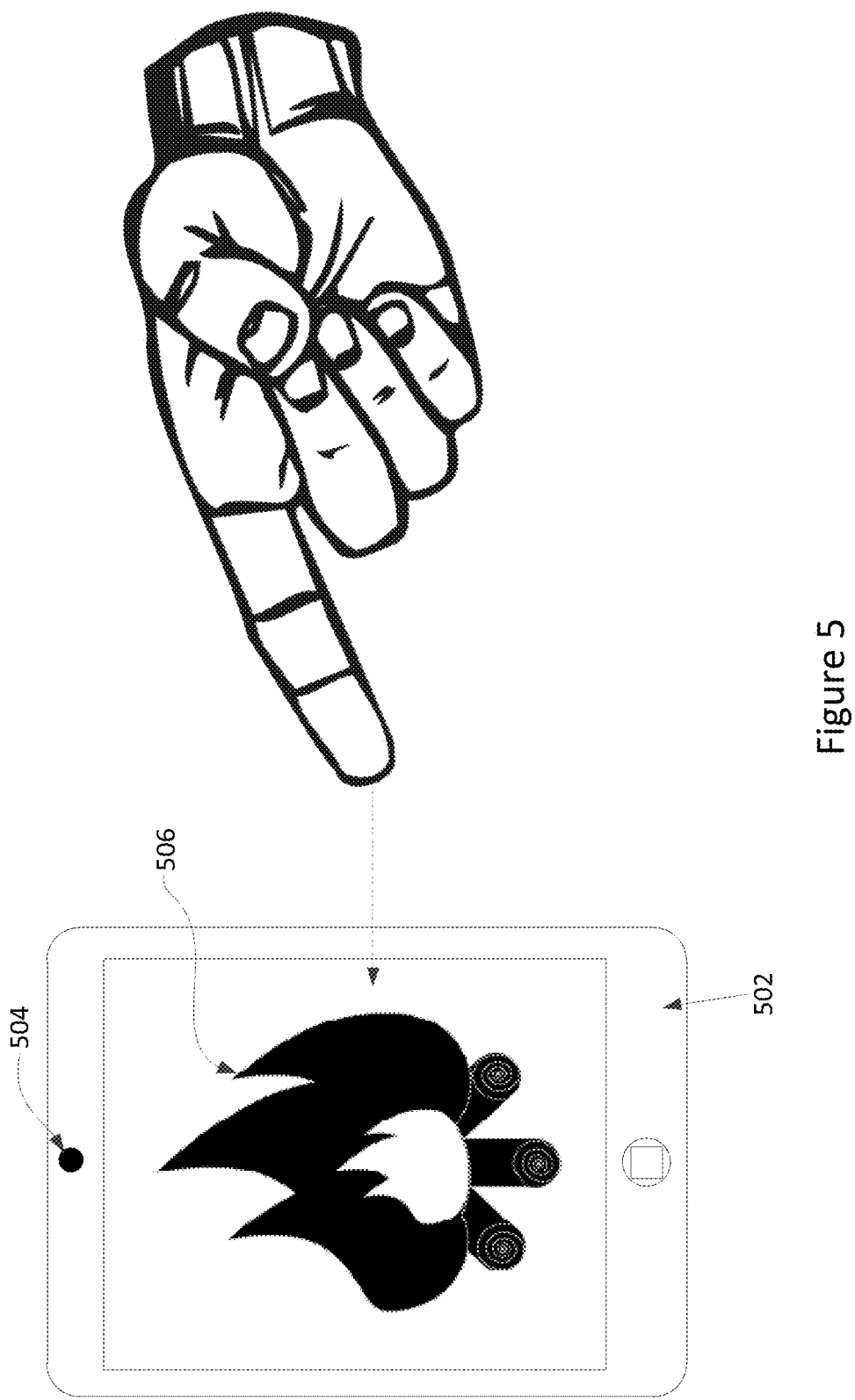
FIG. 5 shows still another embodiment of a system for providing position-based haptic effects.

FIG. 5 shows still another embodiment of a system for providing position-based haptic effects. The system comprises a computing device 502 (e.g., a smart phone or tablet) outputting a virtual object 506 on a display (e.g., a touch-screen display). The computing device 502 is outputting (e.g., via a display) a virtual object 506 comprising, e.g., fire. The computing device 502 is configured to detect a gesture, such as the user approaching and/or moving away from the virtual object 506 (e.g., as shown by the dashed arrow), and responsively output haptic effects. The haptic effects are configured to provide a more realistic and/or immersive haptic experience for the user. For example, the haptic effects may be configured to simulate, e.g., the heat of fire. For instance, in the example shown in FIG. 5, the computing device 502 is configured to output haptic effects (e.g., vibrations or projected heat) comprising increasing intensities in response to detecting the user approaching the computing device 502 and/or decreasing intensities in response to detecting the user moving away from the computing device 502. Further, in some embodiments, the computing device 502 is configured to output a local haptic effect, such as a jolt or shock sensation, in response to detecting the user contacting the computing device 502. In some embodiments, the combination of substantially continuous remote and/or local haptic effects may more realistically simulate a characteristic of the virtual object, such as the increasing or decreasing heat of a fire as the user moves with respect to the fire.

As another example, in some embodiments, the computing device 502 is configured to output (e.g., via a display) a virtual object 506 comprising, e.g., a magnet and/or force field. In such an embodiment, the computing device 502 may output haptic effects comprising increasing intensities in response to detecting the user approaching the computing device 502. For example, the haptic effect may comprise a stream of fluid or gas configured to resist the movement of the user. This may resist against the user approaching the virtual object 506, e.g., simulating magnetic resistance or a force field. The computing device 502 may output haptic effects comprising decreasing intensities in response to detecting the user moving away from the computing device 502. For example, the haptic effect may comprise a stream of fluid or gas configured to aid the movement of the user away from the computing device 502. This may more realistically simulate the magnetic field of the magnet and/or the effects of the force field.

In some embodiments, the haptic effects are configured to provide information to the user. For example, the computing device 502 may execute an application. The application may execute a function which, e.g., may cause damage to the computing device 502 if the function is interrupted. In some embodiments, the computing device 502 is configured to detect the user gesturing toward the computing device 502 (e.g., via position sensor 504) and responsively output a remote haptic effect configured to, e.g., resist the user's movement toward the computing device 502. In some embodiments, the computing device 502 may increase the intensity and/or amount of the resistance as the user continues to approach the computing device 502. This may indicate to the user that the user should not interact with the computing device 502. In some embodiments, the computing device 502 is configured to detect the user ultimately contacting the computing device 502 and responsively output a haptic effect comprising, e.g., a series of pulsed vibrations. This may indicate to the user that the user should not interact with the computing device 502. Further, in some embodiments, the computing device 502 is configured to detect the user sliding a finger across the surface of the computing device 502 (e.g., toward a virtual button output on a touch-screen display) and responsively output a haptic effect comprising, e.g., a perceived increase in a coefficient of friction. This may make it physically more difficult for the user to interact with the computing device 502. The combination of haptic effects may more adequately notify the user of a status, characteristic, and/or other feature of the application.

In some embodiments, the computing device 502 additionally or alternatively outputs a user interface comprising multiple user interface levels, e.g., configured to simulate interacting with the virtual object 506 at different depths and/or interacting with different surfaces of the virtual object 506. For instance, the virtual object 506 may comprise a virtual fruit, such as a peach. The user may interact with a portion of the virtual fruit, such as an outer layer, by gesturing (e.g., positioning a body part) in a first location in real space. In some embodiments, the computing device 502 may detect the gesture and responsively, e.g., output a haptic effect configured to simulate the fuzz or outer skin of the fruit. Further, user may interact with another portion of the virtual fruit, such as an inner layer, by gesturing in a second location in real space. The second position may be closer to the computing device 502 than the first position. In some embodiments, the computing device 502 may detect the gesture in the second location and responsively, e.g., output a haptic effect configured to simulate an internal characteristic of the fruit, such as a squishy or soft texture. In this manner, the computing device 502 can simulate different surfaces and/or depths of a virtual object 506 in response to different gestures.

Illustrative Methods for Providing Position-Based Haptic Effects

Figure 6:
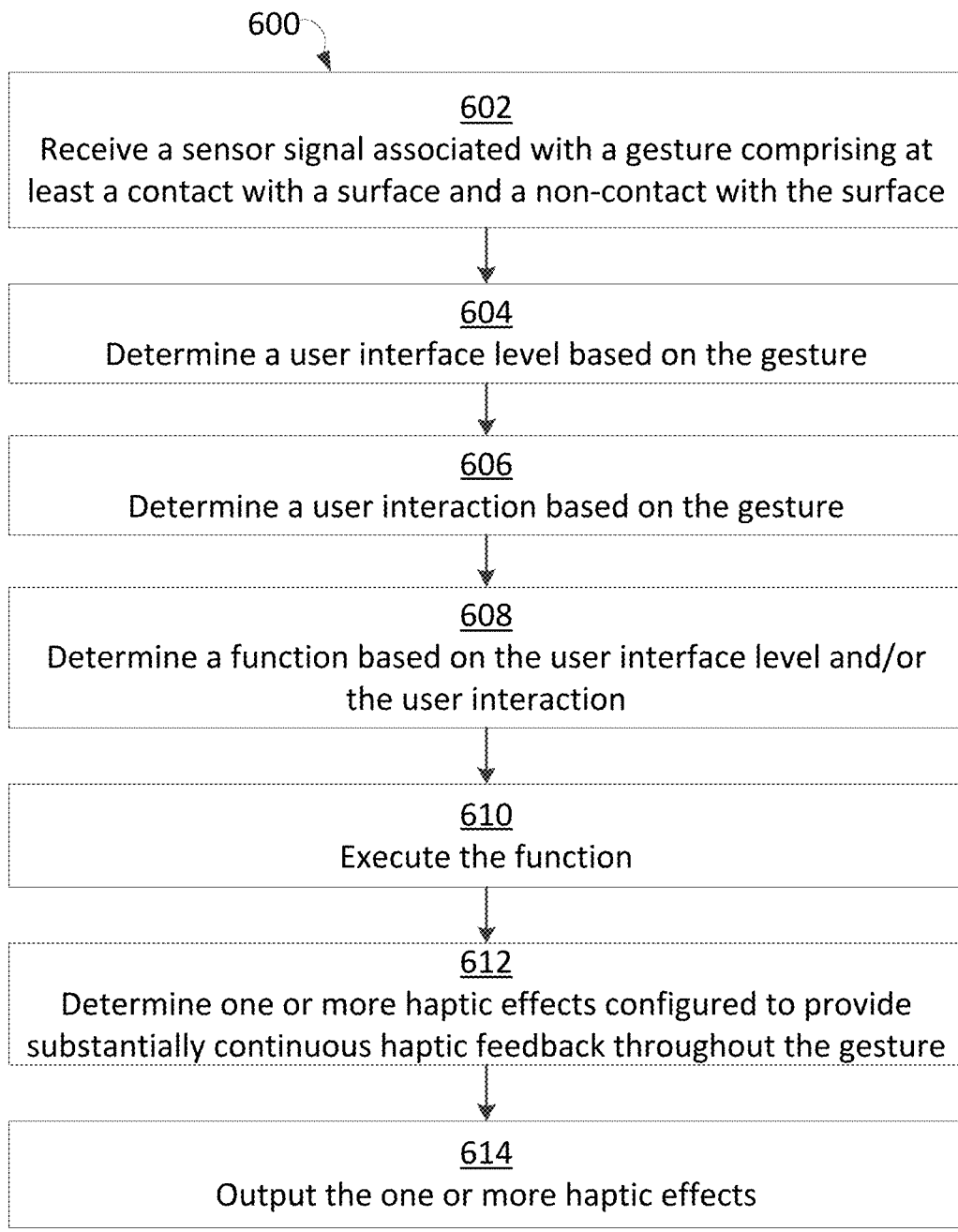
FIG. 6 is a flow chart of steps for performing a method for providing position-based haptic effects according to one embodiment.

FIG. 6 is a flow chart of steps for performing a method for providing position-based haptic effects according to one embodiment. In some embodiments, the steps in FIG. 6 may be implemented in program code that is executed by a processor, for example, the processor in a general purpose computer, a mobile device, or a server. In some embodiments, these steps may be implemented by a group of processors. In some embodiments one or more steps shown in FIG. 6 may be omitted or performed in a different order. Similarly, in some embodiments, additional steps not shown in FIG. 6 may also be performed. The steps below are described with reference to components described above with regard to computing device 201 shown in FIG. 2.

For simplicity, the steps below are described with reference to a drawing application. But the steps below are not limited to such an embodiment, and any combination of the steps can be employed via other types of applications and/or devices.

The method 600 begins at step 602 when the processor 202 receives a sensor signal associated with a gesture comprising at least a contact with a surface (e.g., of computing device 201) and a non-contact with the surface. For example, the processor 202 may execute the drawing application. The user may move a stylus (e.g., or a pen or another object) toward the computing device 201, e.g., for performing one or more drawing operations in the drawing application. The position sensor 232 (e.g., a camera) may capture one or more images associated with the movement of the stylus transmit an associated sensor signal to the processor 202. In such an embodiment, the images may comprise foreground features, such as a portion of the stylus, and background features, such as chairs, tables, walls, desks, etc.

The method 600 continues at step 604 when the processor 202 determines a user interface level based at least in part on the gesture. In some embodiments, the processor 202 is configured to rely on programming contained in memory 204, a lookup table, and/or an algorithm to determine the user interface level. For example, the processor 202 may use a lookup table to map a position in real space (that is associated with the gesture) to a particular user interface level of the drawing application. For example, the processor 202 can map a first position in real space that is at a far distance from the computing device 101 to a first user interface level associated with a perspective view of a drawing output in the drawing application. The processor 202 can map a second position that is at a medium distance from the computing device 101 to a second user interface level associated with a close-up and/or cross-sectional view of the drawing output in the drawing application.

In some embodiments, the processor 202 may associate a single gesture with a user interface level. For example, the processor 202 may associate one specific gesture with a first user interface level and another gesture with a second user interface level. In other embodiments, the processor 202 may associate a plurality of gestures with a user interface level. For example, in some embodiments, the processor 202 may associate any gestures occurring within a range of distances from the computing device 201 (e.g., between 4 inches and 8 inches from a surface of the computing device 201) with a single user interface level.

The method 600 continues at step 606 when the processor 202 determines a user interaction based on the gesture. For example, the processor 202 may determine, e.g., based on the three-dimensional start position and/or end position of the gesture, that the gesture comprises a swipe gesture, a hover gesture, or another type of gesture. The processor 202 may correlate the particular type and/or location of the gesture to a specific user interaction associated with the drawing application, such as activating a line tool, a square shape tool, a paint-brush-size modification tool, etc.

The method 600 continues at step 608 when the processor 202 determines a function based at least in part on the user interface level and/or the user interaction. In some embodiments, the function comprises outputting audio data, video data, and/or information (e.g., a nearby gas station, restaurant, movie theater, police station, or hospital, or a traffic condition or a speed limit); placing a telephone call; sending a text message, SMS message, or e-mail; opening a web browser or accessing a website; opening an application; closing an application; performing background processing; performing foreground processing; saving a file; opening a file; performing a game function; receiving data; sending data; changing an application setting; ordering a product via a network; printing a document; adding an entry to a list; removing an entry from the list; recording a sound; playing media content; opening an e-book; performing a calculation; performing a price comparison; checking a bank balance; and/or any other number and/or configuration of computer functions.

In some embodiments, the function comprises outputting, removing, changing, updating, and/or deleting a virtual object in a user interface. For example, in the drawing application embodiment, the computing device 201 may determine a first function associated with the first user interface level in response to detecting, e.g., the user hovering a finger or the stylus at a far distance from the computing device 201. The first function may comprise, e.g., outputting the perspective view of the drawing. The computing device 201 may further determine a second function associated with the first user interface level in response to detecting, e.g., another gesture in real space at a far distance from the computing device 201. The second function may comprise, e.g., drawing on the virtual canvas (e.g., with a virtual paint brush) along a path defined by the movement of the gesture. In some embodiments, the computing device 201 may determine a third function associated with a second user interface level in response to detecting, e.g., the user hovering a finger at a medium distance from the computing device 201. The function may comprise, e.g., outputting the close-up and/or cross-sectional view of the drawing. In some embodiments, the computing device 201 may further determine a fourth function associated with the second user interface level in response to detecting, e.g., another gesture at a medium distance from the computing device 201. The fourth function may comprise, e.g., erasing along a path defined by the movement gesture. In some embodiments, the computing device 201 may determine a fifth function associated with a third user interface level in response to detecting, e.g., the user contacting the computing device 201. The function may comprise, e.g., saving the virtual image.

The method 600 continues at step 610 when the processor 202 executes the function. In some embodiments, the processor 202 may execute the function by executing one or more sub-functions. For example, if the function comprises saving the virtual image, the processor 202 may communicate with one or more servers (e.g., an image storing database) to obtain a privacy key or password for securely storing the virtual image to a database. The processor 202 may then save the image to the database.

The method 600 continues at step 612 when the processor 202 determines one or more haptic effects configured to provide substantially continuous haptic feedback throughout the gesture.

In some embodiments, the processor 202 determines the one or more haptic effects based at least in part on the gesture and/or a position in real space associated with the gesture. For example, the processor 202 may access a lookup table stored in memory 204 to map positions throughout a gesture to specific haptic effects. In such an embodiment, the lookup table may be preprogrammed in memory and/or programmable by the user.

In some embodiments, the processor 202 determines the one or more haptic effects based at least in part on a distance between the user and the computing device 201. For example, in some embodiments, a user may perceive a first haptic effect, e.g., comprising a projected solid, liquid, gas, plasma, sound pressure wave, and/or laser beam, as stronger within a first distance range (e.g., between 1 mm and 10 cm) from the computing device 201 than another type of haptic effect. Thus, in some embodiments, the processor 202 determines the first remote haptic effect in response to detecting that the user is positioned within the first distance range (e.g., between 1 mm and 10 cm) from the computing device 201.

As another example, in some embodiments, a user may perceive a second haptic effect, e.g., comprising an electrostatic-based capacitive coupling, as stronger within a second distance range (e.g., between 0 mm and 1 mm) from the computing device 201 than another type of haptic effect.

Thus, in some embodiments, the processor 202 determines the second haptic effect in response to detecting that the user is positioned within the second distance range from the computing device 201. As still another example, in some embodiments, a user may perceive a third haptic effect, e.g., comprising a local haptic effect, as stronger within a third distance range (e.g., 0 mm and/or contacting the computing device 201) from the computing device 201 than another type of haptic effect. Thus, in some embodiments, the processor 202 determines the third haptic effect in response to detecting that the user is positioned within the third distance range from the computing device 201 (e.g., contacting the computing device).

In some embodiments, the processor 202 determines a plurality of haptic effects as the user, e.g., approaches the computing device 201 and moves through various distance ranges from the computing device 201. The plurality of haptic effects may comprise any combination of remote and/or local haptic effects to provide substantially continuous haptic feedback to the user.

In some embodiments, the processor 202 determines a haptic effect comprising one or more characteristics (e.g., magnitude, frequency, duration) configured to be perceived by the user as substantially the same as a previously output haptic effect. For example, in some embodiments, the processor 202 may detect the user gesturing in real space (e.g., moving a finger toward the computing device 201). In such an embodiment, the processor 202 may responsively decrease the magnitude of the haptic effect in response to determining the user is moving closer to the computing device 201 and/or increase the magnitude of the haptic effect in response to determining the user is moving farther from the computing device 201. This may provide a user with a substantially consistent haptic experience, e.g., regardless of how close or far the user is to the computing device 201 (e.g., the haptic output device 218).

In some embodiments, the processor 202 determines a haptic effect comprising one or more characteristics (e.g., magnitude, frequency, duration) configured to be perceived by the user as distinct and/or distinguishable from a previously output haptic effect. For example, in some embodiments, the processor 202 may detect the user gesturing in real space. In such an embodiment, the processor 202 may responsively keep the characteristics of the haptic effect constant. Because the user, while gesturing, may be moving closer to and/or farther from the source of the haptic effect, the user may perceive the strength of the haptic effect as varying (e.g., even though the processor 202 is keeping the characteristics of the haptic effect constant). This may provide information to the user, such as how close the user is to the computing device 201.

In some embodiments, the processor 202 determines a haptic effect based at least in part on the user interface level, the gesture, and/or the user interaction. For example, the processor 202 may access a lookup table stored in memory 204 to map a user interface level (e.g., associated with viewing or drawing on a virtual canvas in the drawing application) to specific haptic effects, such as a puff of air or another remote haptic effect. In some embodiments, the processor 202 is configured to determine the haptic effect based on the type, location, duration, and/or other characteristics of the gesture. In some embodiments, the processor 202 may determine the haptic effect based on the type, location, duration, and/or other characteristics of the user interaction. For example, in some embodiments, the processor 202 determines that the user interaction is configured to erase an image in the drawing application and, based on this user interaction, determines an associated haptic effect configured to, e.g., simulate the feeling of erasing a black-board with an eraser.

In some embodiments, the processor 202 determines a haptic effect based at least in part on the function (e.g., a characteristic associated with the function). For example, in some embodiments, the processor 202 may determine a haptic effect associated with a type of the function. For instance, in one embodiment, the processor 202 may determine a haptic effect comprising a short puff of air if the function comprises opening an application, such as the drawing application. In such an embodiment, the processor 202 may determine a haptic effect comprising three short puffs of air if the function comprises closing the application. This may indicate to the function to the user. In some embodiments, the processor 202 determines a haptic effect configured to indicate that the function has been executed. For example, the processor 202 may determine a haptic effect comprising an electrostatic haptic effect once a function comprising selecting a new color for a paintbrush tool in the drawing application has been executed. In some embodiments, the processor 202 is configured to determine different haptic effects based on the result of executing the function. For example, the processor 202 may output a different haptic effect if the function was successfully executed than if the function was not successfully executed.

The method 600 continues at step 614 when the processor 202 outputs the one or more haptic effects. The processor 202 transmits one or more haptic signals associated with the one or more haptic effects to haptic output device 218, which outputs the one or more haptic effect. In some embodiments, the one or more haptic effects are configured to provide substantially continuous haptic feedback throughout the gesture. For example, the processor 202 may transmit a plurality of haptic signals associated with a plurality of haptic effects (e.g., remote and/or local haptic effects). The plurality of haptic effects are configured to provide substantially continuous haptic feedback throughout the gesture and/or another movement in real space.

Advantages of Position-Based Haptic Effects

There are numerous advantages of position-based haptic effects. For example, such systems may provide a more realistic or immersive user experience. For instance, in some embodiments, such systems may provide substantially continuous haptic feedback to the user throughout a gesture, e.g., as the user approaches and/or contacts a computing device. This may more realistically simulate physical phenomena, such as gravity, magnetic fields, electrical fields, wind blowing, resistance to an application of force, and/or heat. For example, in some embodiments, a computing device may execute a virtual apocalypse game in which a virtual nuclear reactor melted down. The computing device may detect a user gesturing toward the computing device and responsively output haptic effects configured to, e.g., simulate radiation contamination. For example, the computing device may substantially continuously output remote haptic effects with increasing amplitude in response to detecting the user approaching the computing device, culminating in an intense vibration in response to the user contacting the computing device. The continuous, intensifying haptic effects may more realistically simulate approaching a site contaminated with radiation.

As another example, in some embodiments, a user may interact with a virtual object (e.g., output on a display) by gesturing in a first location in real space associated with a first user interface level. A computing device may responsively output haptic feedback configured to simulate a surface (e.g., a pillow sheet on a pillow) associated with a virtual object. The user may further interact with the virtual object by gesturing in a second location associated with a second user interface level. The computing device may responsively output haptic feedback configured to simulate a different surface (e.g., the inside of the pillow, such as feathers or memory foam) associated with the virtual object. In some embodiments, this may make the virtual object feel more realistic and/or three-dimensional. Further, by associating different haptic effects with different user interface levels, a user may be able to perceive a plurality of haptic effects while interacting with a single virtual object. This may allow for a greater range of haptic experiences.

In some embodiments, position-based haptic effects may allow the user to make a state determination (e.g., determine the mode a device is in) without looking at the device. Thus, the user may be able to maintain focus on other tasks. For example, a computing device may project remote haptic effects to a user associated with available operations in a program or on a user interface. This may allow the user to interact with the user interface, without having to visually focus on the display. Similarly, a haptic effect may serve as a confirmation that an operation is available, has been completed, or is of a certain level of importance.

In some embodiments, position-based haptic effects may allow for more unique, interactive, and effective user interfaces. For example, in some embodiments, a user may be able to perform a broad range of functions while interacting with different user interface levels associated with the user interface component. Further, in some embodiments, a user may be able to locate the position of a user interface component by hovering a body part over the user interface component and activate the user interface component by moving the body part to another location in real space (e.g., toward the user interface component). This may enable the user to interact with the user interface, e.g., without physically contacting (e.g., tapping and/or gesturing on) a user interface component. Physically contacting a user interface component can be challenging, for example, in a moving vehicle, in which ambient motion, cognitive load, and visual distractions may make it difficult to precisely tap on a user interface component.

In other embodiments, position-based haptic effects may enable non-visual interfaces. For example, in some embodiments, a user may be able to explore a non-visual user interface with the user's finger by gesturing in real space (e.g., in a location associated with a user interface level). Upon the user's finger interacting with the location of an invisible interface component (e.g., a virtual volume switch), the computing device may output haptic feedback. This may allow the user to identify the location of the invisible interface component. Upon identifying the location of the interface component, the user may be able to interact with (e.g., press on) the interface component, e.g., by moving the user's finger to another location in real space (e.g., associated with another user interface level). This may cause the computing device to perform a function associated with the invisible interface component (e.g., increasing a volume level). The computing device may further provide the user with haptic feedback, for example, to confirm receipt of the user input.

GENERAL CONSIDERATIONS

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
    a sensor configured to detect a gesture and transmit a sensor signal associated with the gesture, wherein the gesture comprises a movement through a plurality of positions in real space, the plurality of positions including a first position that is distant from a touch sensitive surface and a second position that is closer to the touch sensitive surface than the first position;
    a processor in communication with the sensor, the processor being configured to receive the sensor signal from the sensor; and
    a memory comprising program code that is executable by the processor to cause the processor to:
        output a graphical user interface (GUI) comprising a plurality of available user interface levels; and
        activate a sequence of user interface levels during the gesture, wherein each user interface level in the sequence is selected from among the plurality of available user interface levels and is activated at a respective position among the plurality of positions in the gesture; and
        cause a haptic output device to provide a haptic feedback associated with each user interface level.

2. The system of claim 1, wherein the second position is between the first position and contact with the touch sensitive surface.

3. The system of claim 1, wherein the second position corresponds to a contact with the touch sensitive surface.

4. The system of claim 3, wherein the haptic feedback comprises a remote haptic effect produced when the movement is at the first position, and a local haptic effect produced when the movement is at the second position.

5. The system of claim 1, wherein the haptic feedback is configured to progressively increase in strength during the movement from the first position to the second position.

6. The system of claim 1, wherein the haptic feedback comprises a haptic effect provided to a user in response to activation of each user interface level, and wherein the haptic effect comprises a different haptic effect for at least two of the plurality of available user interface levels.

7. The system of claim 1, wherein:
    the sensor is further configured to detect a second gesture and transmit a second sensor signal associated with the second gesture, wherein the second gesture comprises a second movement through a plurality of positions in real space, the plurality of positions including a third position that is closer to the touch sensitive surface and a fourth position that is farther from the touch sensitive surface than the third position;
    the processor is further configured to receive the second sensor signal from the sensor; and
    the memory further comprising program code that is executable by the processor to cause the processor to:
        activate a second sequence of user interface levels during the second gesture, wherein each user interface level in the second sequence is selected from among the plurality of available user interface levels and is activated at a respective position among the plurality of positions in the gesture;
        cause the haptic output device to provide a second haptic feedback associated with each user interface level of the second gesture, wherein the second haptic feedback is configured to progressively decrease in strength during the second movement from the third position to the fourth position.

8. The system of claim 1, wherein the memory further comprises program code that is executable by the processor to cause the processor to communicate with a computing device, and wherein the computing device further comprises a vehicle computing system, the vehicle computing system being configured to cause the haptic output device to provide the haptic feedback.

9. The system of claim 8, wherein the vehicle computing system comprises a car computing device, and wherein the car computing device comprises controls for one or more automobile systems.

10. The system of claim 9, wherein the one or more automobile systems comprises a stereo system, a heating, ventilation, and air conditioning system (HVAC), a lighting system, a global positioning system (GPS) device, a navigation system, or any combination thereof.

11. A method comprising:
    receiving, by a processor, a sensor signal from a sensor, the sensor signal being associated with a gesture, wherein the gesture comprises a movement through a plurality of positions in real space, the plurality of positions including a first position that is distant from a touch sensitive surface and a second position that is closer to the touch sensitive surface than the first position;

outputting, by the processor, a graphical user interface (GUI) comprising a plurality of available user interface levels;

activating, by the processor, a sequence of user interface levels during the gesture, wherein each user interface level in the sequence is selected from among the plurality of available user interface levels and is activated at a respective position among the plurality of positions in the gesture; and causing, by the processor, a haptic output device to provide a haptic feedback associated with each user interface level.

12. The method of claim 11, wherein the second position is between the first position and contact with the touch sensitive surface.

13. The method of claim 11, wherein the second position corresponds to a contact with the touch sensitive surface.

14. The method of claim 13, wherein the haptic feedback comprises a remote haptic effect produced when the movement is at the first position, and a local haptic effect produced when the movement is at the second position.

15. The method of claim 11, wherein the haptic feedback is configured to progressively increase in strength during the movement from the first position to the second position.

16. The method of claim 11, wherein the haptic feedback comprises a haptic effect provided to a user in response to activation of each user interface level, and wherein the haptic effect comprises a different haptic effect for at least two of the plurality of available user interface levels.

17. The method of claim 11, further comprising:
detecting, by the sensor, a second gesture, wherein the second gesture comprises a second movement through a plurality of positions in real space, the plurality of positions including a third position that is distant from the touch sensitive surface and a fourth position that is farther from the touch sensitive surface than the third position;
receiving, by the processor, a second sensor signal;
activating, by the processor, a second sequence of user interface levels during the second gesture, wherein each user interface level in the second sequence is selected from among the plurality of available user interface levels and is activated at a respective position among the plurality of positions in the gesture; and
causing, by the processor, the haptic output device to provide a second haptic feedback associated with each user interface level of the second gesture, wherein the second haptic feedback is configured to progressively decrease in strength during the second movement from the third position to the fourth position.

18. The method of claim 11, wherein the method further comprises communicating, by the processor, with a computing device, and wherein the computing device comprises a vehicle computing system, the vehicle computing system being configured to cause the haptic output device to provide the haptic feedback.

19. The method of claim 18, wherein the vehicle computing system comprises a car computing device, and wherein the car computing device comprises controls for one or more automobile systems.

20. The method of claim 19, wherein the one or more automobile systems comprises a stereo system, a heating, ventilation, and air conditioning system (HVAC), a lighting system, a global positioning system (GPS) device, a navigation system, or any combination thereof.

21. A non-transitory computer-readable medium comprising program code that is executable by a processor to cause the processor to:
output a graphical user interface (GUI) comprising a plurality of available user interface levels; and
activate a sequence of user interface levels during a gesture, wherein the gesture comprises a movement through a plurality of positions in real space, the plurality of positions including a first position that is distant from a touch sensitive surface and a second position that is closer to the touch sensitive surface than the first position, and wherein each user interface level in the sequence is selected from among the plurality of available user interface levels and is activated at a respective position among the plurality of positions in the gesture; and
cause a haptic output device to provide a haptic feedback associated with each user interface level.

22. The non-transitory computer-readable medium of claim 21, wherein the second position is between the first position and contact with the touch sensitive surface.

23. The non-transitory computer-readable medium of claim 21, wherein the second position corresponds to a contact with the touch sensitive surface.

24. The non-transitory computer-readable medium of claim 23, wherein the haptic feedback comprises a remote haptic effect produced when the movement is at the first position, and a local haptic effect produced when the movement is at the second position.

25. The non-transitory computer-readable medium of claim 21, wherein the haptic feedback is configured to progressively increase in strength during the movement from the first position to the second position.

26. The non-transitory computer-readable medium of claim 21, further comprising program code that is executable by the processor to cause the processor to:
activate a second sequence of user interface levels during a second gesture, wherein the second gesture comprises a second movement in a direction away from the touch sensitive surface, the second movement being from a third position that is closer to the touch sensitive surface to a fourth position that is farther from the touch sensitive surface than the third position; and
cause the haptic output device to provide a second haptic feedback associated with each user interface level of the second gesture, wherein the second haptic feedback is configured to progressively decrease in strength during the second movement from the third position to the fourth position.

27. The non-transitory computer-readable medium of claim 21, wherein the program code further comprises that is executable by the processor to cause the processor to communicate with a computing device, and wherein the computing device comprises a vehicle computing system, the vehicle computing system being configured to cause the haptic output device to provide the haptic feedback.

28. The non-transitory computer-readable medium of claim 27, wherein the vehicle computing system comprises a car computing device, and wherein the car computing device comprises controls for one or more automobile systems.

29. The non-transitory computer-readable medium of claim 28, wherein the one or more automobile systems comprises a stereo system, a heating, ventilation, and air conditioning system (HVAC), a lighting system, a global positioning system (GPS) device, a navigation system, or any combination thereof.

* * * * *